(12) United States Patent
Liu

(10) Patent No.: US 9,712,314 B2
(45) Date of Patent: Jul. 18, 2017

(54) METHOD, APPARATUS AND SYSTEM FOR ELIMINATING SELF-INTERFERENCE IN A FULL-DUPLEX COMMUNICATION

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 258 days.

(21) Appl. No.: 14/639,731

(22) Filed: Mar. 5, 2015

(65) Prior Publication Data

US 2015/0180640 A1    Jun. 25, 2015

Related U.S. Application Data

(63) Continuation of application No. PCT/CN2013/082859, filed on Sep. 3, 2013.

(30) Foreign Application Priority Data

Sep. 7, 2012 (CN) .......................... 2012 1 0329936

(51) Int. Cl.
*H04L 5/14* (2006.01)
*H04B 1/525* (2015.01)
(Continued)

(52) U.S. Cl.
CPC ............. *H04L 5/1461* (2013.01); *H04B 1/40* (2013.01); *H04B 1/525* (2013.01); *H04B 1/1081* (2013.01)

(58) Field of Classification Search
CPC .................................. H04B 1/50; H04B 1/525
See application file for complete search history.

(56) References Cited

U.S. PATENT DOCUMENTS 6,229,992 B1    5/2001    McGeehan et al.
6,614,766 B1    9/2003    Seki et al.
(Continued)

FOREIGN PATENT DOCUMENTS

CN          1219049 A      6/1999
CN        101425823 A      5/2009
(Continued)

OTHER PUBLICATIONS

Melissa Duarte, et al., "Design and Characterization of a Full-Duplex Multiantenna System for WiFi Networks", IEEE Transactions on Vehicular Technology, vol. 63, No. 3, Mar. 2014, p. 1160-1177.

(Continued)

*Primary Examiner* — Benjamin Lamont

(57) ABSTRACT

Embodiments of the present invention provide a method, an apparatus, and a system for processing an interference signal, so as to eliminate an interference signal in a full duplex multi-antenna system. The method includes: receiving a radio signal, where the signal includes a self-interference signal of a transmit antenna, and the self-interference signal includes a first self-interference signal, and a second self-interference signal; performing primary interference cancellation processing, by using a first reference signal, on the received signal to eliminate the first self-interference signal; and performing secondary interference cancellation processing, by using a second reference signal, on the signal after the primary interference cancellation processing to eliminate the second self-interference signal.

27 Claims, 12 Drawing Sheets

(51) Int. Cl.
*H04B 1/40* (2015.01)
*H04B 1/10* (2006.01)

(56) References Cited

U.S. PATENT DOCUMENTS

| | | | |
|---|---|---|---|
| 9,325,432 B2* | 4/2016 | Hong | H04B 15/00 |
| 2006/0098765 A1 | 5/2006 | Thomas et al. | |
| 2006/0153283 A1* | 7/2006 | Scharf | H04B 1/7107 |
| | | | 375/148 |
| 2008/0089397 A1 | 4/2008 | Vetter et al. | |
| 2009/0213770 A1* | 8/2009 | Mu | H04B 1/123 |
| | | | 370/281 |
| 2010/0150032 A1 | 6/2010 | Zinser et al. | |
| 2012/0003948 A1 | 1/2012 | Lackey | |
| 2012/0147790 A1 | 6/2012 | Khojastepour et al. | |
| 2012/0201153 A1* | 8/2012 | Bharadia | H04B 1/525 |
| | | | 370/252 |
| 2012/0201173 A1* | 8/2012 | Jain | H04B 1/525 |
| | | | 370/277 |
| 2013/0102254 A1* | 4/2013 | Cyzs | H04B 1/126 |
| | | | 455/63.1 |
| 2013/0279399 A1* | 10/2013 | Wilhelmsson | H04B 7/155 |
| | | | 370/315 |
| 2013/0286903 A1* | 10/2013 | Khojastepour | H04L 5/14 |
| | | | 370/280 |
| 2014/0016515 A1* | 1/2014 | Jana | H04L 5/143 |
| | | | 370/278 |

FOREIGN PATENT DOCUMENTS

| | | | | |
|---|---|---|---|---|
| CN | WO 2009056410 A1 * | 5/2009 | | H04B 1/525 |
| CN | 101529729 A | 9/2009 | | |
| SU | 675382 A1 | 7/1979 | | |

OTHER PUBLICATIONS

Dinesh Bharadia, et al., "Full Duplex MIMO Radios", 13 pages. Proceedings of the 11th USENIX Symposium on Networked Systems Design and Implementation, Apr. 2-4, 2014.

Dinesh Bharadia, et al., "Full Duplex Radios", 12 pages. Proceedings of the ACM SIGCOMM 2013 conference on SIGCOMM, Aug. 12-16, 2013.

Mayank Jain, et al., "Practical, Real-time, Full Duplex Wireless", MobiCom'11, Sep. 19-23, 2011, 12 pages.

Jung Il Choi, et al., "Achieving Single Channel, Full Duplex Wireless Communication", 12 pages. Sep. 20-24, 2010.

Jung Il Choi, et al., "Full-Duplex Wireless Design", 3 pages. Nov. 21, 2011 (courtesy of Wayback machine).

* cited by examiner

METHOD, APPARATUS AND SYSTEM FOR ELIMINATING SELF-INTERFERENCE IN A FULL-DUPLEX COMMUNICATION

CROSS-REFERENCE TO RELATED APPLICATION

This application is a continuation of International Application No. PCT/CN2013/082859, filed on Sep. 3, 2013, which claims priority to Chinese Patent Application No. 201210329936.X, filed on Sep. 7, 2012, both of which are hereby incorporated by reference in their entireties.

TECHNICAL FIELD

The present invention relates to the field of communications, and in particular, to a method, an apparatus, and a system for processing an interference signal.

BACKGROUND

In a wireless communication system such as a mobile cellular communication system, a wireless local area network, or fixed wireless access, abase station or a communication node such as an access point, a relay station, and a user equipment generally has a capability of transmitting its own signal and receiving a signal of another communication node. In a wireless full duplex technology, receiving and transmitting operations are simultaneously performed on a same wireless channel, and theoretically, spectral efficiency is twice that of a conventional frequency division duplex or time division duplex technology, so the wireless full duplex technology gradually becomes a next generation communication hotspot technology to which attention is paid. The premise of implementing wireless full duplex lies in avoiding, reducing, and eliminating strong interference of a transmit signal of a same transceiver to a received signal as much as possible, so that the transmit signal does not affect correct reception of a wanted signal.

Moreover, in a wireless communication system, the propagation environment is far more complex than that of point-to-point wireless communication, a radio signal is mainly propagated in a non-line-of-sight manner, the distance between two communication ends may be as far as several hundreds of meters or larger, and MIMO is widely applied to these systems. For example, in a mobile cellular communication system such as LTE or UMTS, a base station is configured with at least two transmit antennas and two receive antennas, and a power difference between a received signal and a transmit signal may generally be up to 80 dB to 140 dB or even larger. In these systems, in the conventional wireless full duplex technology, a radio signal of each transmit antenna may be coupled to each receive antenna in a MIMO scenario, while in the prior art, self-interference of a single transmit antenna or a part of transmit antennas can only be canceled, and interference suppression efficiency is not high, so the interference signal in a full duplex multi-antenna system cannot be effectively eliminated.

SUMMARY

In view of this, embodiments of the present invention provide a method, an apparatus, and a system for processing an interference signal, so as to eliminate an interference signal in a full duplex multi-antenna system.

In a first aspect, an embodiment of the present invention provides a method for processing an interference signal, where the method includes: receiving a radio signal, where the signal includes a self-interference signal of a transmit antenna, the self-interference signal includes a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold; performing primary interference cancellation processing, by using a first reference signal, on the received signal to eliminate the first self-interference signal, where the first reference signal is obtained by coupling a local transmit signal; and performing secondary interference cancellation processing, by using a second reference signal, on the signal after the primary interference cancellation processing to eliminate the second self-interference signal, where the second reference signal is obtained by coupling a local transmit signal.

In a first possible implementation manner of the first aspect, the self-interference signal further includes a third self-interference signal, power of the third self-interference signal is less than the second power threshold, and a time delay of the third self-interference signal is greater than the second time delay threshold; and after the performing secondary interference cancellation processing, the method further includes: performing tertiary interference cancellation processing, by using a third reference signal, on the signal after the primary interference cancellation processing and the secondary interference cancellation processing to eliminate the third self-interference signal, where the third reference signal includes: a digital baseband signal of a transmit end, a signal for compensating a digital baseband signal of a transmit end, or a signal obtained by performing down-conversion and analog-to-digital conversion on the first reference signal.

With reference to the first aspect or the first possible implementation manner of the first aspect, in a second possible implementation manner, the first self-interference signal includes a main-path self-interference signal; if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal includes a transmit signal of each local transmit antenna or a transmit signal of a local transmit antenna; and the performing primary interference cancellation processing to eliminate the first self-interference signal: the performing the primary interference cancellation processing to eliminate the main-path self-interference signal.

With reference to the first aspect or the foregoing implementation manners of the first aspect, in a third possible implementation manner, the second self-interference signal includes a near-zone reflection self-interference signal, the near-zone reflection self-interference signal is generated after a local transmit signal enters a local receive end through a non-line-of-sight path reflected by a near-zone diffuser, and the local transmit signal includes a transmit signal of each local transmit antenna or includes a transmit signal of a local transmit antenna; and the performing secondary interference cancellation processing to eliminate the second self-interference signal includes: performing the secondary interference cancellation processing to eliminate the near-zone reflection self-interference signal.

With reference to the first aspect or the foregoing implementation manners of the first aspect, in a fourth possible implementation manner, the third self-interference signal includes a far-zone reflection self-interference signal, the far-zone reflection self-interference signal is generated after a local transmit signal enters a local receive end through a non-line-of-sight path reflected by a far-zone diffuser, and the local transmit signal includes a transmit signal of each local transmit antenna or includes a transmit signal of a local transmit antenna; and the performing tertiary interference cancellation processing to eliminate the third self-interference signal includes: performing the tertiary interference cancellation processing to eliminate the far-zone reflection self-interference signal.

With reference to the first aspect or the foregoing implementation manners of the first aspect, in a fifth possible implementation manner, after the performing primary interference cancellation processing to eliminate the first self-interference signal, the method further includes: performing low noise amplification processing on the signal after the first self-interference signal is eliminated; and the performing secondary interference cancellation processing, by using a second reference signal, on the signal after the primary interference cancellation processing includes: performing the secondary interference cancellation processing, by using the second reference signal, on the signal processed by the primary interference cancellation processing and the low noise amplification processing.

With reference to the first aspect or the foregoing implementation manners of the first aspect, in a sixth possible implementation manner, after the second self-interference signal is eliminated, the method further includes: performing down-conversion processing on the signal after the second self-interference signal is eliminated; and the performing tertiary interference cancellation processing, by using a third reference signal, on the signal after the primary interference cancellation processing and the secondary interference cancellation processing includes: the performing the tertiary interference cancellation processing, by using the third reference signal, on the signal after the primary interference cancellation processing, the secondary interference cancellation processing, and the down-conversion processing.

With reference to the first aspect or the foregoing implementation manners of the first aspect, in a seventh possible implementation manner, the performing tertiary interference cancellation processing, by using a third reference signal, on the signal after the primary interference cancellation processing and the secondary interference cancellation processing includes: performing analog-to-digital conversion on the signal after the primary interference cancellation processing and the secondary interference cancellation processing, and subtracting the third reference signal after digital filter processing, from the signal after the analog-to-digital conversion.

With reference to the first aspect or the foregoing implementation manners of the first aspect, in an eighth possible implementation manner, the performing tertiary interference cancellation processing, by using a third reference signal, on the signal after the primary interference cancellation processing and the secondary interference cancellation processing further includes: subtracting a fourth reference signal after filter processing, from the signal after the primary interference cancellation processing and the secondary interference cancellation processing; the fourth reference signal is obtained by using the following signal: the third reference signal, an analog baseband signal of a transmit antenna, a signal for compensating an analog baseband signal of a transmit antenna, or a signal obtained by performing down-conversion on the first reference signal; and the performing analog-to-digital conversion on the signal after the primary interference cancellation processing and the secondary interference cancellation processing, and subtracting the third reference signal after digital filter processing, from the signal after the analog-to-digital conversion include: subtracting the fourth reference signal after the filter processing, from the signal after the primary interference cancellation processing and the secondary interference cancellation processing, performing the analog-to-digital conversion on the signal after the subtraction, and subtracting the third reference signal after the digital filter processing, from the signal after the analog-to-digital conversion.

With reference to the first aspect or the foregoing implementation manners of the first aspect, in a ninth possible implementation manner, if a local end includes a plurality of local transmit antennas, the first reference signal includes a plurality of first sub-reference signals, and the first self-interference signal includes a plurality of first sub-self-interference signals, where each of the first sub-self-interference signals corresponds to each local transmit antenna of the plurality of local transmit antennas, and the first sub-reference signal is obtained by coupling a transmit signal of a local transmit antenna corresponding to a first sub-self-interference signal; the performing primary interference cancellation processing, by using a first reference signal, on the received signal includes: performing multiple primary sub-processing, by using the first sub-reference signals, on the received signal; and the performing primary sub-processing includes: subtracting a first sub-reference signal after delay and amplitude-phase adjustment, from the signal to be processed by the primary sub-processing to eliminate a first sub-self-interference signal corresponding to a local transmit antenna corresponding to the first sub-reference signal.

With reference to the first aspect or the foregoing implementation manners of the first aspect, in a tenth possible implementation manner, if a local end includes a plurality of local transmit antennas, the second reference signal includes a plurality of second sub-reference signals, and the second self-interference signal includes a plurality of second sub-self-interference signals, where each of the second sub-self-interference signals corresponds to each local transmit antenna of the plurality of local transmit antennas, and the second sub-reference signal is obtained by coupling a transmit signal of a local transmit antenna corresponding to a second sub-self-interference signal; the performing secondary interference cancellation processing, by using a second reference signal, on the received signal includes: performing multiple secondary sub-processing, by using the second sub-reference signals, on the received signal; and the performing secondary sub-processing includes: subtracting a second sub-reference signal after filter processing, from the signal to be processed by the secondary sub-processing to eliminate a second sub-self-interference signal corresponding to a local transmit antenna corresponding to the second sub-reference signal.

In a second aspect, an embodiment of the present invention provides an apparatus for processing an interference signal, where the apparatus includes one or more local transmit antennas, and the apparatus includes: a receiving unit, a primary interference cancellation processing unit, and a secondary interference cancellation processing unit, where the receiving unit is configured to receive a radio signal, where the signal includes a self-interference signal of the local transmit antenna, the self-interference signal includes a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold; the primary interference cancellation processing unit is configured to perform primary interference cancellation processing, by using a first reference signal, on the received signal to eliminate the first self-interference signal, where the first reference signal is obtained by coupling a local transmit signal; and the secondary interference cancellation processing unit is configured to perform secondary interference cancellation processing, by using a second reference signal, on the signal after the primary interference cancellation processing to eliminate the second self-interference signal, where the second reference signal is obtained by coupling a local transmit signal.

In a first possible implementation manner of the second aspect, the self-interference signal further includes a third self-interference signal, power of the third self-interference signal is less than the second power threshold, and a time delay of the third self-interference signal is greater than the second time delay threshold; and the apparatus further includes a tertiary interference cancellation processing unit, configured to perform tertiary interference cancellation processing, by using a third reference signal, on the signal after the primary interference cancellation processing and the secondary interference cancellation processing to eliminate the third self-interference signal, where the third reference signal includes: a digital baseband signal of a transmit end, a signal for compensating a digital baseband signal of a transmit end, or a signal obtained by performing down-conversion and analog-to-digital conversion on the first reference signal.

With reference to the second aspect or the foregoing implementation manner of the second aspect, in a second possible implementation manner, the first self-interference signal includes a main-path self-interference signal; if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal includes a transmit signal of each local transmit antenna or a transmit signal of a local transmit antenna; and the primary interference cancellation processing unit is configured to eliminate the main-path self-interference signal.

With reference to the second aspect or the foregoing implementation manners of the second aspect, in a third possible implementation manner, the second self-interference signal includes a near-zone reflection self-interference signal, the near-zone reflection self-interference signal is generated after a local transmit signal enters a local receive end through a non-line-of-sight path reflected by a near-zone diffuser, and the local transmit signal includes a transmit signal of each local transmit antenna or includes a transmit signal of a local transmit antenna; and the second interference cancellation processing unit is configured to eliminate the near-zone reflection self-interference signal.

With reference to the second aspect or the foregoing implementation manners of the second aspect, in a fourth possible implementation manner, the third self-interference signal includes a far-zone reflection self-interference signal, the far-zone reflection self-interference signal is generated after a local transmit signal enters a local receive end through a non-line-of-sight path reflected by a far-zone diffuser, and the local transmit signal includes a transmit signal of each local transmit antenna or includes a transmit signal of a local transmit antenna; and the tertiary interference cancellation processing unit is configured to eliminate the far-zone reflection self-interference signal.

With reference to the second aspect or the foregoing implementation manners of the second aspect, in a fifth possible implementation manner, the apparatus further includes a low noise amplification processing unit, configured to perform, after the first self-interference signal is eliminated, low noise amplification processing on the signal after the first self-interference signal is eliminated; and the secondary interference cancellation processing unit is configured to perform the secondary interference cancellation processing, by using the second reference signal, on the signal processed by the primary interference cancellation processing unit and the low noise amplification processing unit.

With reference to the second aspect or the foregoing implementation manners of the second aspect, in a sixth possible implementation manner, the apparatus further includes a down-conversion unit, configured to: after the second self-interference signal is eliminated, perform down-conversion processing on the signal after the second self-interference signal is eliminated; and the tertiary interference cancellation processing unit performs the tertiary interference cancellation processing, by using the third reference signal, on the signal processed by the primary interference cancellation processing unit, the secondary interference cancellation processing unit, and the down-conversion unit.

With reference to the second aspect or the foregoing implementation manners of the second aspect, in a seventh possible implementation manner, the tertiary interference cancellation processing unit is configured to perform analog-to-digital conversion on the signal after the primary interference cancellation processing and the secondary interference cancellation processing, and subtract the third reference signal after digital filter processing, from the signal after the analog-to-digital conversion.

With reference to the second aspect or the foregoing implementation manners of the second aspect, in an eighth possible implementation manner, the tertiary interference cancellation processing unit is configured to subtract a fourth reference signal after filter processing, from the signal after the primary interference cancellation processing and the secondary interference cancellation processing, perform the analog-to-digital conversion on the signal after the subtraction, and subtract the third reference signal after the digital filter processing, from the signal after the analog-to-digital conversion; and the fourth reference signal is obtained by using the following signal: the third reference signal, an analog baseband signal of a transmit antenna, a signal for compensating an analog baseband signal of a transmit antenna, or a signal obtained by performing down-conversion on the first reference signal.

With reference to the second aspect or the foregoing implementation manners of the second aspect, in a ninth possible implementation manner, if the apparatus includes a plurality of local transmit antennas, the first reference signal includes a plurality of first sub-reference signals, and the first self-interference signal includes a plurality of first sub-self-interference signals, where each of the first sub-self-interference signals corresponds to each local transmit antenna of the plurality of local transmit antennas, and the first sub-reference signal is obtained by coupling a transmit signal of a local transmit antenna corresponding to a first sub-self-interference signal; and the primary interference cancellation processing unit is configured to perform multiple primary sub-processing, by using the plurality of first sub-reference signals, on the received signal, and in each primary sub-processing, subtract a corresponding first sub-reference signal after delay and amplitude-phase adjustment, from the signal to be processed by the primary sub-processing to eliminate a first sub-self-interference signal corresponding to a local transmit antenna corresponding to the first sub-reference signal.

With reference to the second aspect or the foregoing implementation manners of the second aspect, in a tenth possible implementation manner, the primary interference cancellation processing unit includes at least one primary interference cancellation processing subunit, and the primary interference cancellation processing subunit includes an error control signal extracting unit, a delay and amplitude-phase tracking unit, and an interference signal cancellation unit, where the error control signal extracting unit is configured to generate an error control signal according to an output of the interference signal cancellation unit in the primary interference cancellation processing subunit; the delay and amplitude-phase tracking unit is configured to perform delay and amplitude-phase tracking on a first sub-reference signal according to the error control signal to obtain a reconstructed first sub-self-interference signal; and the interference signal cancellation unit is configured to subtract the reconstructed first sub-self-interference signal from the signal input by the primary interference cancellation processing subunit to eliminate the first sub-self-interference signal.

With reference to the second aspect or the foregoing implementation manners of the second aspect, in an eleventh possible implementation manner, the primary interference cancellation processing unit includes an error control signal extracting unit and at least one primary interference cancellation processing subunit, and the primary interference cancellation processing subunit includes a delay and amplitude-phase tracking unit and an interference signal cancellation unit, where the error control signal extracting unit is configured to generate an error control signal according to an output of the interference signal cancellation unit in the at least one primary interference cancellation processing subunit; the delay and amplitude-phase tracking unit in each interference cancellation processing subunit is configured to perform delay and amplitude-phase tracking on a first sub-reference signal according to the error control signal to obtain a reconstructed first sub-self-interference signal; and the interference signal cancellation unit is configured to subtract the reconstructed first sub-self-interference signal from the signal input by the primary interference cancellation processing subunit to eliminate the first sub-self-interference signal.

With reference to the second aspect or the foregoing implementation manners of the second aspect, in a twelfth possible implementation manner, the secondary interference cancellation processing unit includes at least one secondary interference cancellation processing subunit, and the secondary interference cancellation processing subunit includes an error control signal extracting unit, a filter unit, and an interference signal cancellation unit, where the error control signal extracting unit is configured to generate an error control signal according to an output of the interference signal cancellation unit in the secondary interference cancellation processing subunit; the filter unit is configured to perform filter processing on a second sub-reference signal according to the error control signal to obtain a reconstructed second sub-self-interference signal; and the interference signal cancellation unit is configured to subtract the reconstructed second sub-self-interference signal from the signal input by the secondary interference cancellation processing subunit to eliminate the second sub-self-interference signal.

With reference to the second aspect or the foregoing implementation manners of the second aspect, in a thirteenth possible implementation manner, the secondary interference cancellation processing unit includes an error control signal extracting unit and at least one secondary interference cancellation processing subunit, and the secondary interference cancellation processing subunit includes a filter unit and an interference signal cancellation unit, where the error control signal extracting unit is configured to generate an error control signal according to an output of the interference signal cancellation unit in the at least one secondary interference cancellation processing subunit; the filter unit is configured to perform filter processing on a second sub-reference signal according to the error control signal to obtain a reconstructed second sub-self-interference signal; and the interference signal cancellation unit is configured to subtract the reconstructed second sub-self-interference signal from the signal input by the secondary interference cancellation processing subunit to eliminate the second sub-self-interference signal.

In a third aspect, an embodiment of the present invention provides a system having an interference signal elimination function, where the system includes a sending apparatus, and the interference elimination apparatus described as above, and the sending apparatus is configured to send a radio signal received by the interference elimination apparatus.

By using the foregoing solutions, in the embodiments of the present invention, according to power and delay characteristics, a self-interference signal during full duplex communication is divided into various self-interference signals which are greatly different in terms of power, a multi-path delay, and the like. For formation characteristics of a self-interference signal, interference suppression is performed on each component, thereby improving interference suppression efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It may be understood by persons skilled in the art that the accompanying drawings are merely schematic diagrams of an exemplary embodiment, and that modules or processes in the accompanying drawings are not necessarily required in implementing the present invention.

Figure 1:
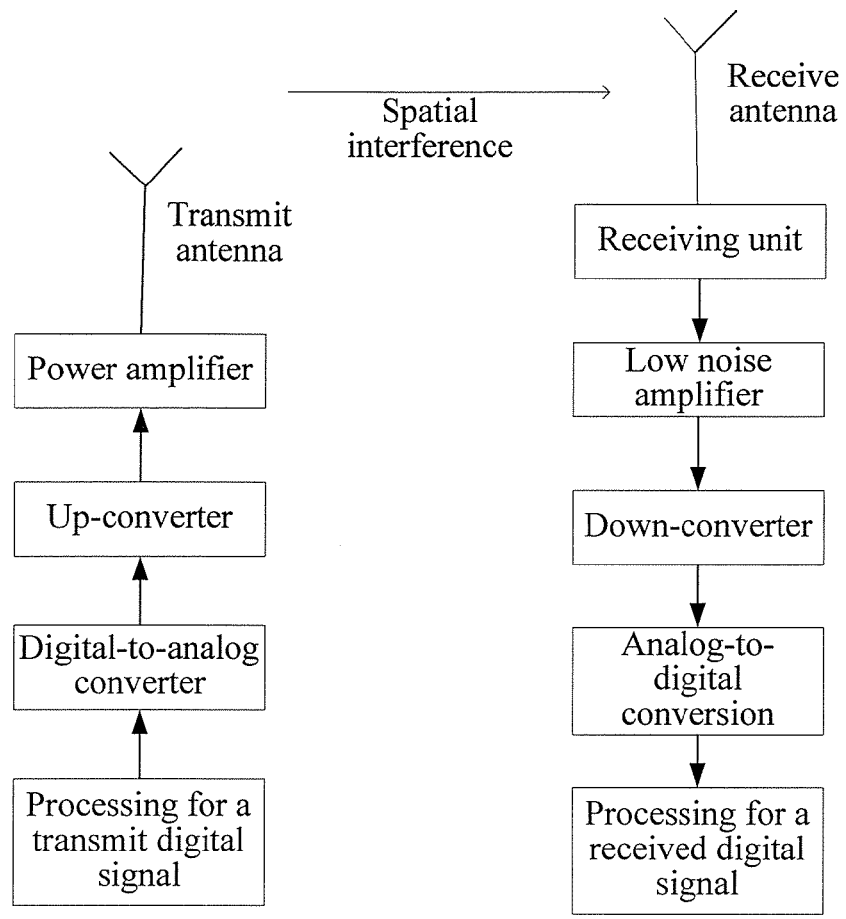
FIG. 1 is a structural diagram of a transmission branch and a receiving branch according to an embodiment of the present invention.

A transceiver system formed of a transmit antenna and a receive antenna includes: a digital-to-analog converter (Digital to Analog Converter, DAC), an up-converter and a power amplifier (PA for short) of a transmission channel, and a low noise amplifier (Low Noise Amplifier, LNA), a down-converter, and an analog-to-digital converter (analog digital converter, ADC) of a receiving channel, as shown in FIG. 1. Additionally, the transmission and receiving channels generally further include an auxiliary function unit such as a filter or an amplifier, which is not shown in FIG. 1.

FIG. 1 shows a situation where an antenna is shared for reception and transmission, and a circulator, for example, is adopted to isolate a transmit end and a receive end. However, the self-interference cancellation processing manner and the system structure thereof are also applicable to a situation where different antennas are adopted for reception and transmission. For the purpose of simplification, the drawing only shows a self-interference cancellation structure of a receiving branch, an actual system may include a plurality of receiving branches, and the structure of each receiving branch is still as shown in FIG. 1.

If a transmit end is configured with two transmit antennas ANT#1 and ANT#2 (which respectively correspond to transmission branch #1 and transmission branch #2), using the transmission branch #1 as an example, a digital baseband signal Tx1_BB to be transmitted which is generated by a digital baseband signal processing unit is firstly converted by a digital-to-analog converter (DAC, Digital to Analog Converter) into an analog signal, then the analog signal is processed by an intermediate radio frequency unit of the transmission branch such as an up-converter or a PA, and a radio frequency signal to be transmitted is generated, and the radio frequency signal is transmitted by the antenna ANT#1 through a circulator. Meanwhile, the antenna ANT #1 is also configured to receive a signal from a communication peer; the signal received by the antenna ANT #1 includes a wanted signal component from the communication peer, and further includes a self-interference signal of the transmission branch #1 transmitted through the antenna ANT#1 and reflected back by near-zone and far-zone diffusers thereof, and a self-interference signal of the transmission branch #2 transmitted through the antenna ANT#2, entering the antenna ANT#1 through a spatial direct path and reflected back by the near-zone and far-zone diffusers thereof. These signals, after being received by the antenna ANT#1, enter the receiving branch #1 through a circulator. The transmit/receive isolation of the circulator is finite (generally 20 dB to 30 dB), so the radio frequency signal to be transmitted of the transmission branch #1 may also be leaked to the receiving branch #1 through the circulator to become a main-path self-interference signal corresponding to the transmission branch #1. As described above, if no circulator is adopted to perform transmit/receive isolation and instead, different transmit/receive antennas are used, a main-path self-interference signal derived from a transmit signal of the transmission branch #1 enters a receive antenna of the receiving branch #1 through a spatial direct path.

In the embodiment of the present invention, the formation of a self-interference signal is directed to a situation where a transmit end only has a transmit antenna (namely, a transmission branch), or in a MIMO system, a transmit end generally has a plurality of transmit antennas (corresponding to a plurality of transmission branches). At this time, self-interference signals of any receiving branch are a sum of self-interference signals corresponding to each transmission branch and entering the receiving branch, where self-interference signals corresponding to each transmission branch all include the foregoing three types of self-interference signal components.

An LNA, a down-conversion intermediate radio frequency unit (including modules such as a down-converter and a filter), and an ADC of a receiving branch are typical receiver function units.

In the embodiment of the present invention, the formation of a self-interference signal is directed to a situation where a transmit end only has a transmit antenna (namely, a transmission branch), or in a MIMO system, a transmit end generally has a plurality of transmit antennas (corresponding to a plurality of transmission branches). At this time, self-interference signals of any receiving branch are a sum of self-interference signals corresponding to each transmission branch and entering the receiving branch, where self-interference signals corresponding to each transmission branch include a first self-interference signal, a second self-interference signal, or a third self-interference signal, or any combination of the foregoing three signals.

Figure 2:
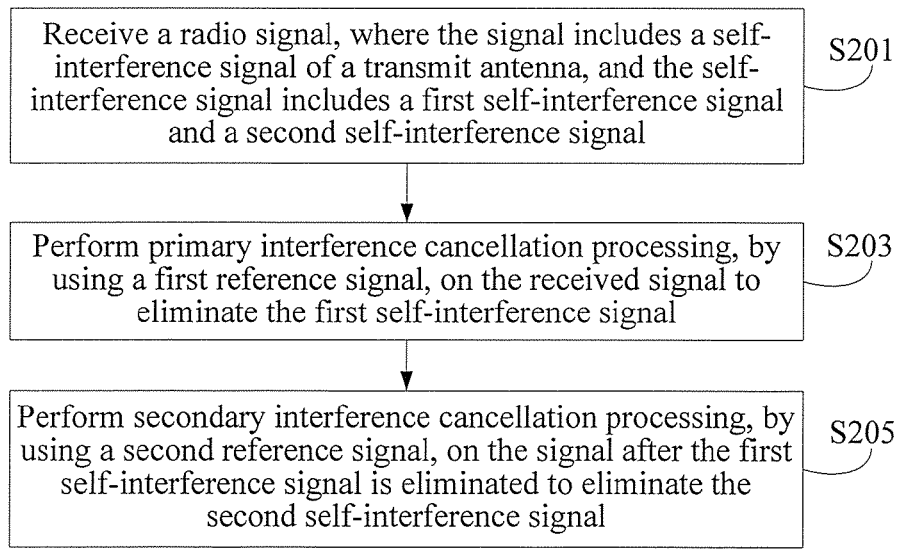
FIG. 2 is a flow chart of an embodiment of a method for processing an interference signal according to the present invention.

An embodiment of the present invention provides a method for processing an interference signal, as shown in FIG. 2. FIG. 2 provides a flow chart of the method for processing an interference signal according to the embodiment of the present invention. The method includes: S201, receiving a radio signal, where the signal includes a self-interference signal of a transmit antenna, the self-interference signal includes a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold; S203, performing primary interference cancellation processing, by using a first reference signal, on the received signal to eliminate the first self-interference signal, where the first reference signal is obtained by coupling a local transmit signal; and S205, performing secondary interference cancellation processing, by using a second reference signal, on the signal after the primary interference cancellation processing to eliminate the second self-interference signal, where the second reference signal is obtained by coupling a local transmit signal.

The power and the time delay threshold are confirmed according to an empirical value of persons skilled in the art, and are relevant to factors such as a channel environment and system complexity. Typically, a main-path self-interference signal is an interference signal with the strongest power, and the delay thereof is within 1 ns. For an indoor scenario or a micro base station scenario, the delay of a near-zone reflection self-interference signal is within 30 ns, and a signal whose delay is above 30 ns may be used as a far-zone reflection self-interference signal; for an outdoor scenario where transmit power is high, the delay of a near-zone reflection self-interference signal is within 100 ns, and a signal whose delay is above 100 ns may be used as a far-zone reflection self-interference signal.

In an embodiment of the present invention, the local transmit signal includes a radio frequency signal of a local transmit antenna.

In the embodiment of the present invention, according to power and delay characteristics, a self-interference signal during full duplex communication is divided into various self-interference signals which are greatly different in terms of power, a multi-path delay, and the like. For formation characteristics of a self-interference signal, interference suppression is performed on each component, thereby improving interference suppression efficiency.

Figure 3:
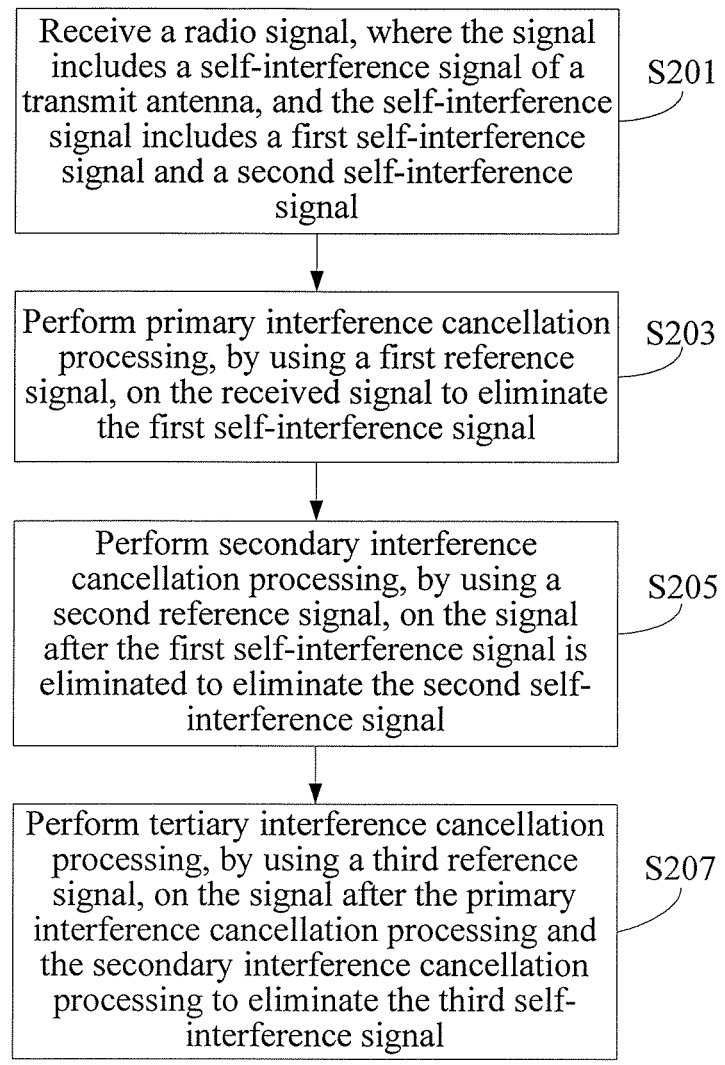
FIG. 3 is a flow chart of an embodiment of a method for processing an interference signal according to the present invention.

In another embodiment of the present invention, as shown in FIG. 3, FIG. 3 provides a flow chart of an embodiment of a method for processing an interference signal according to the present invention. The self-interference signal further includes a third self-interference signal, power of the third self-interference signal is less than the second power threshold, and a time delay of the third self-interference signal is greater than the second time delay threshold; and after the performing secondary interference cancellation processing, the method further includes: S207, performing tertiary interference cancellation processing, by using a third reference signal, on the signal after the primary interference cancellation processing and the secondary interference cancellation processing to eliminate the third self-interference signal, where the third reference signal includes: a digital baseband signal of a transmit end, a signal for compensating a digital baseband signal of a transmit end, or a signal obtained by performing down-conversion and analog-to-digital conversion on the first reference signal.

In an embodiment of the present invention, if nonlinear distortion (resulting from a unit such as a PA) of a transmission channel is large, a multi-path time delay duplicate generated by using a baseband signal of a transmission branch as a reference cannot effectively cancel a self-interference signal component in a baseband received signal. Therefore, when the nonlinear distortion of the transmission channel is large (for example, exceeding 0.5%), the nonlinear characteristic of each transmission branch needs to be measured, and accordingly a baseband signal of each transmission branch is correspondingly compensated, so that the compensated baseband signal becomes a baseband signal corresponding to a radio frequency signal (containing nonlinear distortion) transmitted by each transmission branch.

In an embodiment of the present invention, the first self-interference signal includes a main-path self-interference signal; if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal includes a transmit signal of each local transmit antenna or a transmit signal of a local transmit antenna; and the performing primary interference cancellation processing to eliminate the first self-interference signal is to eliminate the main-path self-interference signal.

In the embodiment of the present invention, a main-path self-interference signal is a component of a self-interference signal with highest strength (typically, the power is $P_T-60$ dBm, where $P_T$ is power of a local transmit signal). The distance between a transmit antenna and a receive antenna is very short, locations of the transmit antenna and receive antenna are relatively fixed, and a parameter of the transmission channel analog part also changes slowly, so the signal delay is very short (typically, in the order of magnitude of 0.1 ns to 1 ns). The delay, amplitude, and phase change little and slowly as time goes (when an antenna is shared for reception and transmission, a signal of a signal to be transmitted which is leaked to the front end of a receiver has the same characteristic).

In an embodiment of the present invention, the second self-interference signal includes a near-zone reflection self-interference signal, the near-zone reflection self-interference signal is generated after a local transmit signal enters a local receive end through a non-line-of-sight path reflected by a near-zone diffuser, and the local transmit signal includes a transmit signal of each local transmit antenna or includes a transmit signal of a local transmit antenna; and the performing secondary interference cancellation processing to eliminate the second self-interference signal includes: performing the secondary interference cancellation processing to eliminate the near-zone reflection self-interference signal.

In another embodiment of the present invention, the second self-interference signal includes a near-zone reflection self-interference signal, and a part of a residual main-path self-interference signal.

The near-zone reflection self-interference signal corresponds to a near-zone reflection path of about 0.3 m to 10 m. Due to absorption of a diffuser and larger propagation path loss compared with LOS, the power of the component is obviously lower than that of the main-path self-interference component (typically the power thereof is lower than 4-60 dBm), and the typical multi-path propagation delay is in the order of magnitude of 1 ns to 30 ns. The propagation environment of an area near the transmit/receive antenna changes little, so the delay of the self-interference signal changes little and slowly as time goes. A near-zone reflection self-interference signal component corresponding to each transmission branch is a multi-path time delay duplicate corresponding to a transmit signal of a transmission branch, so the second reference signal and the first reference signal are the same.

In an embodiment of the present invention, the third self-interference signal includes a far-zone reflection self-interference signal, the far-zone reflection self-interference signal is generated after a local transmit signal enters a local receive end through a non-line-of-sight path reflected by a far-zone diffuser, and the local transmit signal includes a transmit signal of each local transmit antenna or includes a transmit signal of a local transmit antenna; and the performing tertiary interference cancellation processing to eliminate the third self-interference signal includes: performing the tertiary interference cancellation processing to eliminate the far-zone reflection self-interference signal.

In another embodiment of the present invention, the third self-interference signal includes a far-zone reflection self-interference signal and a part of a near-zone reflection self-interference signal; or, the third self-interference signal includes a far-zone reflection self-interference signal and a part of a residual main-path self-interference signal; or, the third self-interference signal includes a far-zone reflection self-interference signal, a part of a near-zone reflection self-interference signal, and a part of a residual main-path self-interference signal.

The far-zone reflection self-interference signal corresponds to a far-zone reflection path of about above 10 m (typically, dozens of meters to several hundreds of meters). The propagation path through which the far-zone reflection self-interference signal passes is long, the far-zone reflection self-interference signal may be reflected by a diffuser more than once, and the power of the far-zone reflection self-interference signal after entering a local receive antenna again is far lower than that of the foregoing two types of self-interference components (typically the power thereof is lower than $P_T$–80 dBm) However, in a system for wireless communication such as mobile cellular communication, the distance between two communication ends is very large and a radio signal transmitted by a peer likewise passes through a complex spatial propagation path. Therefore, although the power of the component is far lower than that of the foregoing two types of self-interference components, the signal strength thereof is still sufficient to cause strong interference to a wanted signal from a communication peer. The far-zone reflection path is long, so the typical multi-path propagation delay is in the order of magnitude of 30 ns to 1 µs. The far-zone propagation environment of the transmit/receive antenna changes greatly (impact of wind and vehicle movement), so the delay of the self-interference signal changes quickly as time goes.

To sum up, arrangement is made according to a sequence of power from high to low, and the sequence is as follows: main-path self-interference signal, near-zone reflection self-interference signal, and far-zone reflection self-interference signal; arrangement is made according to a sequence of the delay time from short to long, and the sequence is as follows: main-path self-interference signal, near-zone reflection self-interference signal, and far-zone reflection self-interference signal.

In the embodiment of the present invention, by considering the impact of a local transmit signal in near-zone and far-zone multi-path propagation, suppression is performed according to different characteristics of a self-interference signal in near-zone and far-zone multi-path propagation, thereby improving the self-interference cancellation performance of the full duplex technology.

Figure 4:
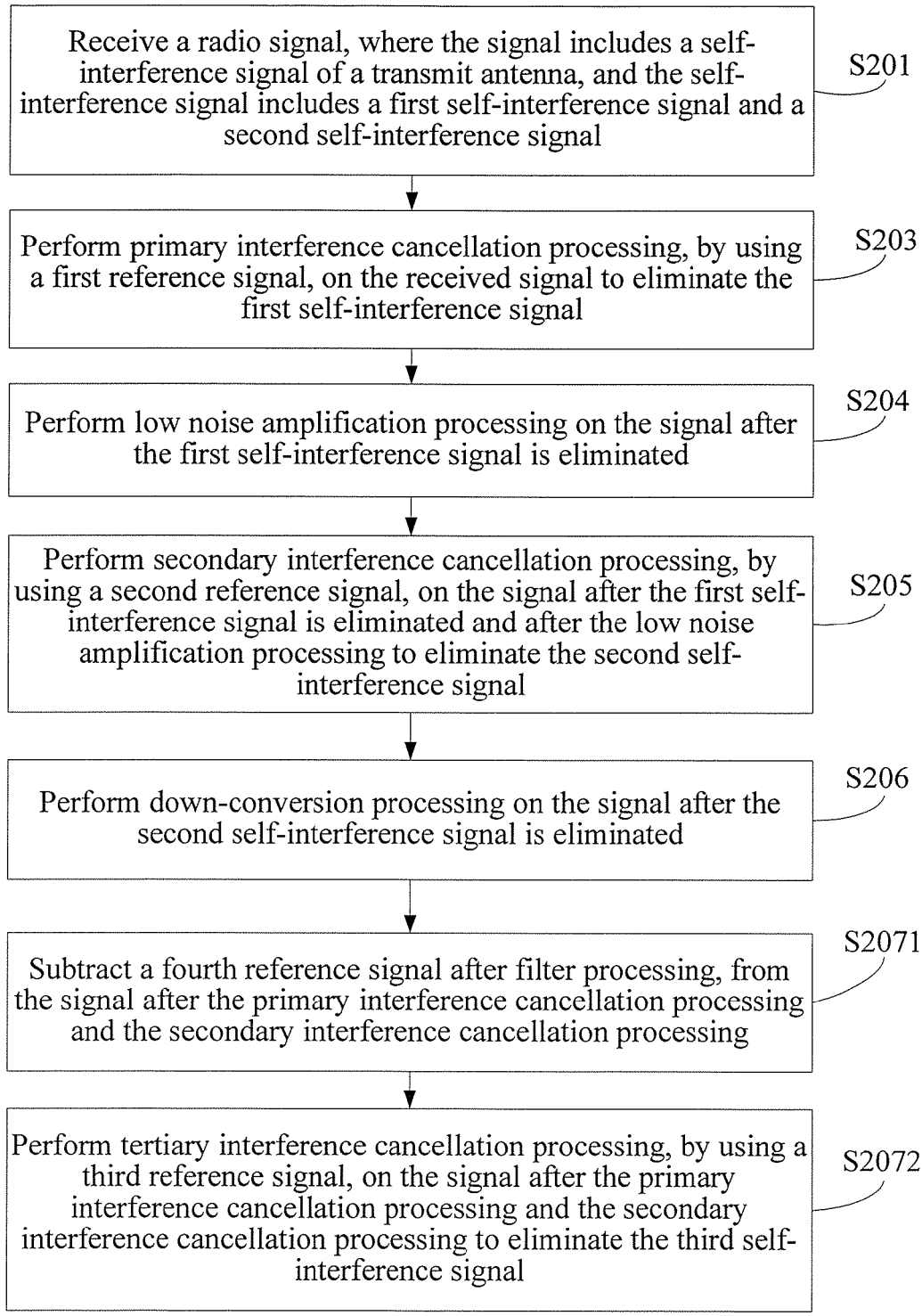
FIG. 4 is a flow chart of another embodiment of a method for processing an interference signal according to the present invention.

In an embodiment of the present invention, as shown in FIG. 4, FIG. 4 provides a flow chart of a method for processing an interference signal according to an embodiment of the present invention. After S203 of eliminating the first self-interference signal, the method further includes: S204, performing low noise amplification processing on the signal after the first self-interference signal is eliminated; and the performing secondary interference cancellation processing, by using a second reference signal, on the signal after the primary interference cancellation processing includes: performing the secondary interference cancellation processing, by using the second reference signal, on the signal processed by the primary interference cancellation processing and the low noise amplification processing.

The power of the main-path self-interference signal is very high. Before low noise amplification processing (Low Noise Amplifier, LNA), the main-path self-interference is firstly canceled to prevent the front end of the receiver from being blocked by saturation of the low noise amplification processor at the front end of the receiver.

A wanted signal received from a communication peer after the low noise amplification processing is still very weak, and the strength of the near-zone reflection self-interference signal after the low noise amplification processing is far greater than that of the wanted signal part in the received signal. After the LNA, the near-zone reflection self-interference signal interference component is canceled to avoid saturation of a radio frequency or intermediate frequency amplification unit after the LNA.

In an embodiment of the present invention, after S205 of eliminating the second self-interference signal, the method further includes: S206, performing down-conversion processing on the signal after the second self-interference signal is eliminated; and the performing tertiary interference cancellation processing, by using a third reference signal, on the signal after the primary interference cancellation processing and the secondary interference cancellation processing includes: the performing the tertiary interference cancellation processing, by using the third reference signal, on the signal after the primary interference cancellation processing, the secondary interference cancellation processing, and the down-conversion processing.

After the primary interference cancellation processing and the secondary interference cancellation processing, the power of the self-interference signal is already low, which does not cause saturation of the radio frequency or intermediate frequency amplification unit after the LNA, so the self-interference signal may enter these units for signal amplification and down-conversion to become a baseband signal.

In an embodiment of the present invention, the performing tertiary interference cancellation processing, by using a third reference signal, on the signal after the primary interference cancellation processing and the secondary interference cancellation processing includes: S207, performing analog-to-digital conversion on the signal after the primary interference cancellation processing and the secondary interference cancellation processing, and subtracting the third reference signal after digital filter processing, from the signal after the analog-to-digital conversion.

At this time, the received signal still includes a far-zone reflection self-interference signal component, and residual interference of the main-path and near-zone reflection self-interference signal components which still cannot be completely canceled by the primary interference cancellation processing and the secondary interference cancellation processing. Then the received signal becomes a digital baseband signal after passing through the ADC. The strength of the far-zone reflection self-interference signal is within the range of the strength of the wanted signal received from the communication peer; at this time, the multi-path delay of the far-zone reflection self-interference component is large, and the sampling rate of the ADC just satisfies the requirement of distinguishing this type of self-interference component time delay, so a digital baseband interference elimination unit is responsible for further performing cancellation processing on these self-interference signals, thereby reducing the power of the self-interference signals to a sufficiently low level, to enable a subsequent digital baseband signal receiving and processing unit to correctly receive a wanted received signal from the communication peer. After the baseband ADC (the sampling rate of the ADC just satisfies the requirement for distinguishing this type of self-interference component time delay), digital filtering is adopted to eliminate the interference of the far-zone reflection self-interference signal.

In the full duplex interference cancellation solution of the prior art, spatial interference suppression and radio frequency front end analog interference cancellation can only implement self-interference suppression of about 60 dB, while in a mobile cellular communication system, a power difference between a received signal and a transmit signal may generally be up to 80 dB to 140 dB or even larger, so even after the spatial interference suppression and the radio frequency front end analog interference cancellation, a baseband received signal may still exceed the dynamic range of the ADC to cause signal distortion; the prior art is mainly directed to problems that self-interference blocks the radio frequency front end of the receiver, and that self-interference causes the received signal to exceed the dynamic range of the ADC. However, even if the self-interference signal is already reduced to a level within the dynamic range of the ADC, because in a mobile cellular communication system, a part of wanted received signals may be very weak, and the power of the residual self-interference signal still far exceeds that of these wanted received signals, these wanted signals cannot be correctly received. The method provided in the embodiment of the present invention solves the foregoing problems well.

In an embodiment of the present invention, the performing tertiary interference cancellation processing, by using a third reference signal, on the signal after the primary interference cancellation processing and the secondary interference cancellation processing further includes: S2071 and S2072, subtracting a fourth reference signal after filter processing, from the signal after the primary interference cancellation processing and the secondary interference cancellation processing; the fourth reference signal is obtained by using the following signal: the third reference signal, an analog baseband signal of a transmit antenna, a signal for compensating an analog baseband signal of a transmit antenna, or a signal obtained by performing down-conversion on the first reference signal; and the performing analog-to-digital conversion on the signal after the primary interference cancellation processing and the secondary interference cancellation processing, and subtracting the third reference signal after digital filter processing, from the signal after the analog-to-digital conversion include: subtracting the fourth reference signal after the filter processing, from the signal after the primary interference cancellation processing and the secondary interference cancellation processing, performing the analog-to-digital conversion on the signal after the subtraction, and subtracting the third reference signal after the digital filter processing, from the signal after the analog-to-digital conversion.

In a system for wireless communication such as mobile cellular communication, the dynamic range of a wanted received signal is originally very wide, and is typically 70 dB to 80 dB or even larger particularly in an uplink link from a terminal to a base station, and a broadband high-speed ADC generally can only achieve the bit width of 12 bits due to the limitation of cost and engineering, that is, the margin (Margin) of the dynamic range of the ADC is finite, and once the power of the self-interference signal in the baseband signal before the ADC is too high, the analog baseband signal may be easily caused to exceed the dynamic range of the ADC to cause quantization distortion. Therefore, an analog baseband interference elimination unit may be added before the ADC to perform preliminary cancellation processing on the self-interference signal in the baseband signal, thereby ensuring that the analog baseband signal is within the dynamic range of the ADC.

In another embodiment of the present invention, the primary interference cancellation processing and the secondary interference cancellation processing can be both located before the LNA; or, if the LNA is formed of multiple stages of amplification circuits, the primary interference cancellation processing and the secondary interference cancellation processing may be located at different locations in the amplification circuit of the LNA at each stage; or, the primary interference cancellation processing is located before the LNA, multiple stages of radio frequency signal amplification modules are further included after the LNA and before the down-conversion, and then the secondary interference cancellation processing may be located at different locations of the multiple stages of radio frequency signal amplification modules.

In an embodiment of the present invention, if a local end includes a plurality of local transmit antennas, the first reference signal includes a plurality of first sub-reference signals, and the first self-interference signal includes a plurality of first sub-self-interference signals, where each of the first sub-self-interference signals corresponds to each local transmit antenna of the plurality of local transmit antennas, and the first sub-reference signal is obtained by coupling a transmit signal of a local transmit antenna corresponding to a first sub-self-interference signal; the performing primary interference cancellation processing, by using a first reference signal, on the received signal includes: performing multiple primary sub-processing, by using the first sub-reference signals, on the received signal; and the performing primary sub-processing includes: subtracting a first sub-reference signal after delay and amplitude-phase adjustment, from the signal to be processed by the primary sub-processing to eliminate a first sub-self-interference signal corresponding to a local transmit antenna corresponding to the first sub-reference signal.

Figure 5:
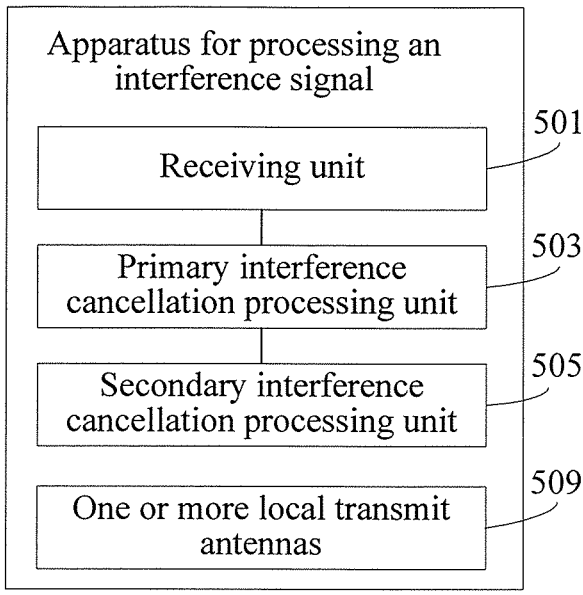
FIG. 5 is a schematic structural diagram of an embodiment of an apparatus for processing an interference signal according to the present invention.

An embodiment of the present invention provides an apparatus for processing an interference signal, as shown in FIG. 5. FIG. 5 provides a schematic structural diagram of the embodiment of the apparatus for processing an interference signal according to the present invention. The apparatus includes: a receiving unit 501, a primary interference cancellation processing unit 503, a secondary interference cancellation processing unit 505, and one or more local transmit antennas 509; the receiving unit 501 is configured to receive a radio signal, where the signal includes a self-interference signal of the transmit antenna, the self-interference signal includes a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold; the primary interference cancellation processing unit 503 is configured to perform primary interference cancellation processing, by using a first reference signal, on the received signal to eliminate the first self-interference signal, where the first reference signal is obtained by coupling a local transmit signal; and the secondary interference cancellation processing unit 505 is configured to perform secondary interference cancellation processing, by using a second reference signal, on the signal after the primary interference cancellation processing to eliminate the second self-interference signal, where the second reference signal is obtained by coupling a local transmit signal.

Figure 6:
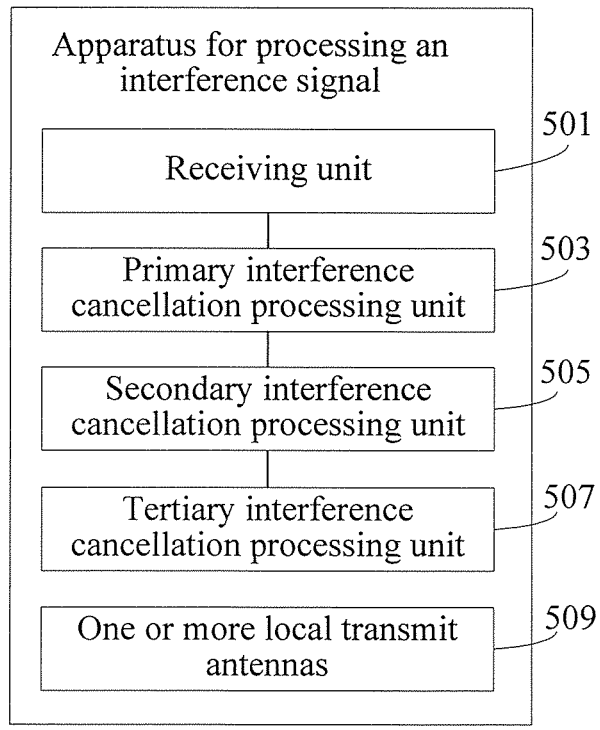
FIG. 6 is a schematic structural diagram of another embodiment of an apparatus for processing an interference signal according to the present invention.

In an embodiment of the present invention, as shown in FIG. 6, FIG. 6 provides a schematic structural diagram of another embodiment of an apparatus for processing an interference signal according to the present invention. The self-interference signal further includes a third self-interference signal, power of the third self-interference signal is less than the second power threshold, and a time delay of the third self-interference signal is greater than the second time delay threshold; and the apparatus further includes a tertiary interference cancellation processing unit 507, configured to perform tertiary interference cancellation processing, by using a third reference signal, on the signal after the primary interference cancellation processing and the secondary interference cancellation processing to eliminate the third self-interference signal, where the third reference signal includes: a digital baseband signal of a transmit end, a signal for compensating a digital baseband signal of a transmit end, or a signal obtained by performing down-conversion and analog-to-digital conversion on the first reference signal.

In an embodiment of the present invention, the first self-interference signal includes a main-path self-interference signal; if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal includes a transmit signal of each local transmit antenna or a transmit signal of a local transmit antenna; and the primary interference cancellation processing unit is configured to eliminate the main-path self-interference signal.

In an embodiment of the present invention, the second self-interference signal includes a near-zone reflection self-interference signal, the near-zone reflection self-interference signal is generated after a local transmit signal enters a local receive end through a non-line-of-sight path reflected by a near-zone diffuser, and the local transmit signal includes a transmit signal of each local transmit antenna or includes a transmit signal of a local transmit antenna; and the second interference cancellation processing unit is configured to eliminate the near-zone reflection self-interference signal.

Figure 7:
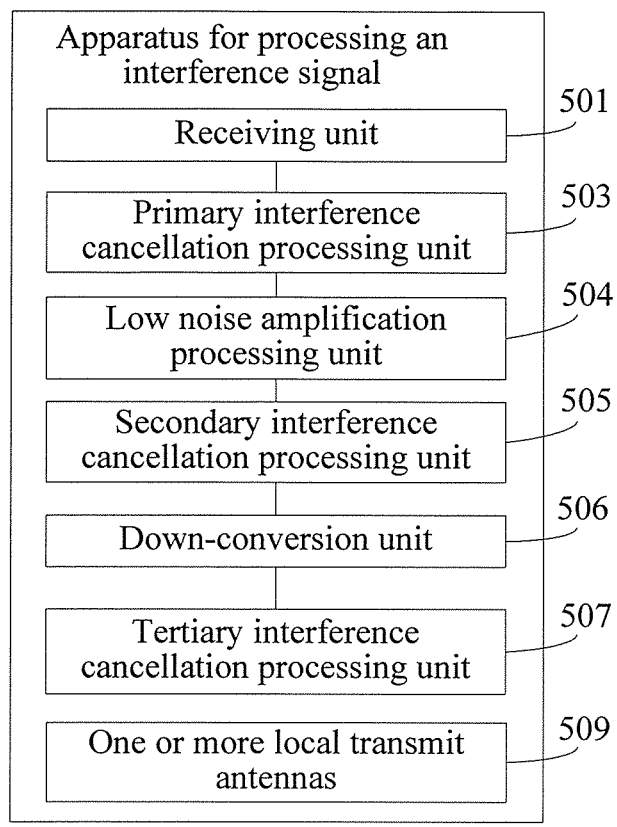
FIG. 7 (a) and FIG. 7 (b) is a schematic structural diagram of another embodiment of an apparatus for processing an interference signal according to the present invention.
Figure 7:
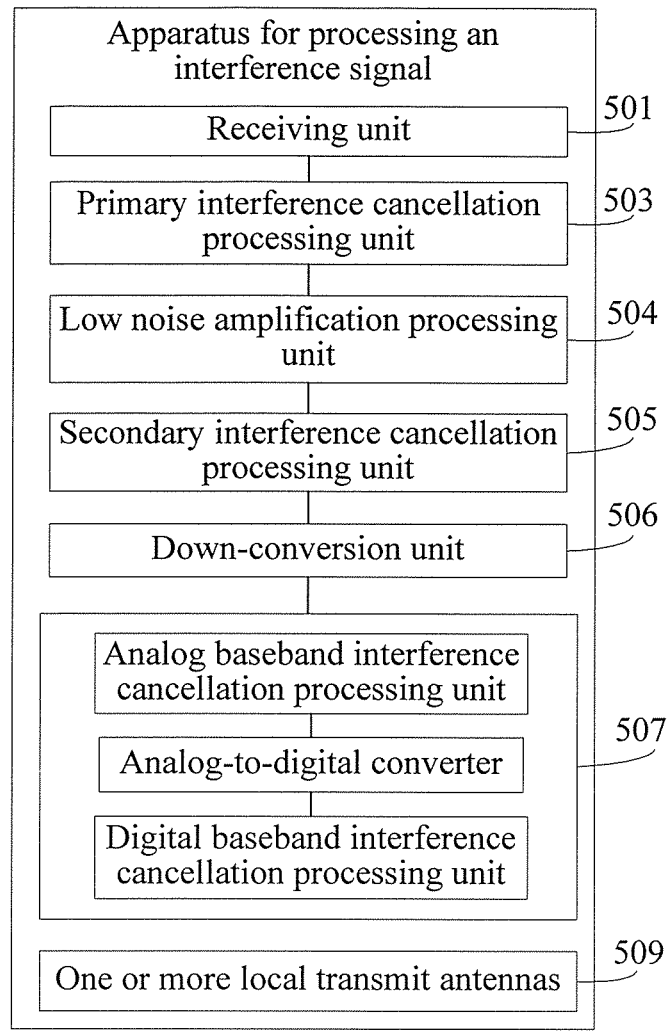

In an embodiment of the present invention, as shown in FIG. 7 (a), FIG. 7 (a) provides a schematic structural diagram of another embodiment of an apparatus for processing an interference signal according to the present invention. The apparatus further includes a low noise amplification processing unit 504, configured to perform, after the first self-interference signal is eliminated, low noise amplification processing on the signal after the first self-interference signal is eliminated; and the secondary interference cancellation processing unit is configured to perform the secondary interference cancellation processing, by using the second reference signal, on the signal processed by the primary interference cancellation processing unit and the low noise amplification processing unit.

In an embodiment of the present invention, the apparatus further includes a down-conversion unit 506, configured to: after the second self-interference signal is eliminated, perform down-conversion processing on the signal after the second self-interference signal is eliminated; and the tertiary interference cancellation processing unit performs the tertiary interference cancellation processing, by using the third reference signal, on the signal processed by the primary interference cancellation processing unit, the secondary interference cancellation processing unit, and the down-conversion unit.

FIG. 7 (b) provides a schematic structural diagram of still another embodiment of the apparatus for processing an interference signal according to the present invention. The tertiary interference cancellation processing unit includes a digital baseband interference cancellation processing unit and an analog baseband interference cancellation processing unit. As shown in FIG. 7 (b), FIG. 7 (b) gives a further detailed structure of the tertiary interference cancellation processing unit in FIG. 7 (a).

In an embodiment of the present invention, the tertiary interference cancellation processing unit includes a digital baseband interference cancellation processing unit, and the digital baseband interference cancellation processing unit is configured to perform analog-to-digital conversion on the signal after the primary interference cancellation processing and the secondary interference cancellation processing, and subtract the third reference signal after digital filter processing, from the signal after the analog-to-digital conversion.

In an embodiment of the present invention, the tertiary interference cancellation processing unit further includes an analog baseband interference cancellation processing unit, the analog baseband interference cancellation processing unit is configured to subtract a fourth reference signal after filter processing, from the signal after the primary interference cancellation processing and the secondary interference cancellation processing, and the digital baseband interference cancellation processing unit subtracts the fourth reference signal after the filter processing, from the signal after the primary interference cancellation processing and the secondary interference cancellation processing, performs the analog-to-digital conversion on the signal after the subtraction, and subtracts the third reference signal after the digital filter processing, from the signal after the analog-to-digital conversion; and the fourth reference signal is obtained by using the following signal: the third reference signal, an analog baseband signal of a transmit antenna, a signal for compensating an analog baseband signal of a transmit antenna, or a signal obtained by performing down-conversion on the first reference signal.

In an embodiment of the present invention, the third self-interference signal includes a far-zone reflection self-interference signal, the far-zone reflection self-interference signal is generated after a local transmit signal enters a local receive end through a non-line-of-sight path reflected by a far-zone diffuser, and the local transmit signal includes a transmit signal of each local transmit antenna or includes a transmit signal of a local transmit antenna; and the tertiary interference cancellation processing unit is configured to eliminate the far-zone reflection self-interference signal.

In an embodiment of the present invention, when the apparatus includes a plurality of local transmit antennas, the first reference signal includes a plurality of first sub-reference signals, and the first self-interference signal includes a plurality of first sub-self-interference signals, where each of the first sub-self-interference signals corresponds to each local transmit antenna of the plurality of local transmit antennas, and the first sub-reference signal is obtained by coupling a transmit signal of a local transmit antenna corresponding to a first sub-self-interference signal; and the primary interference cancellation processing unit is configured to perform multiple primary sub-processing, by using the plurality of first sub-reference signals, on the received signal, and in each primary sub-processing, subtract a corresponding first sub-reference signal after delay and amplitude-phase adjustment, from the signal to be processed by the primary sub-processing to eliminate a first sub-self-interference signal corresponding to a local transmit antenna corresponding to the first sub-reference signal.

Figure 8:
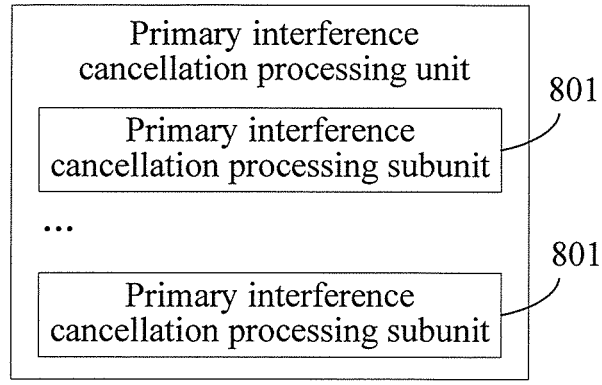
FIG. 8 (a) and FIG. 8 (b) is a schematic structural diagram of an embodiment of a primary interference cancellation processing unit according to the present invention.
Figure 8:
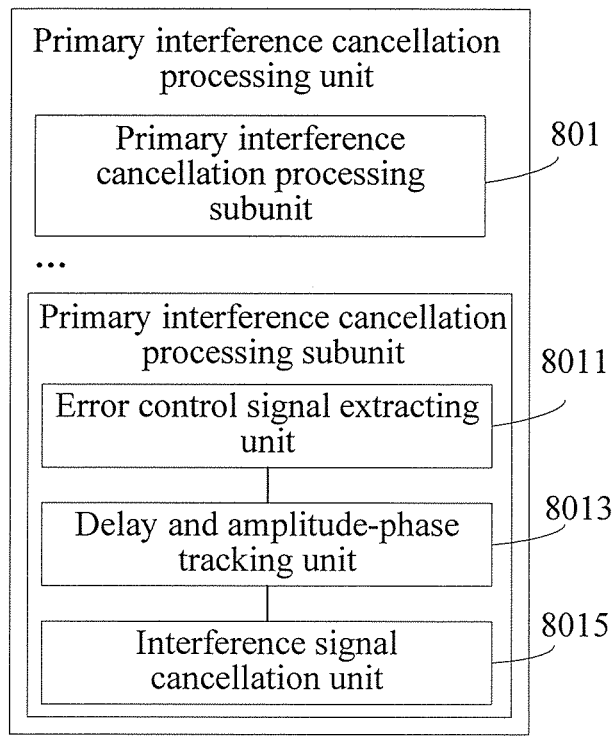

As shown in FIG. 8 (a), FIG. 8 (a) is a structural diagram of an embodiment of a primary interference cancellation processing unit according to the present invention. The primary interference cancellation processing unit includes at least one primary interference cancellation processing subunit 801. As shown in FIG. 8 (b), FIG. 8 (b) is a structural diagram of an embodiment of a primary interference cancellation processing unit according to the present invention. FIG. 8 (b) gives a further detailed structure of the primary interference cancellation processing subunit 801 in FIG. 8(a). The primary interference cancellation processing subunit 801 includes an error control signal extracting unit 8011, a delay and amplitude-phase tracking unit 8013, and an interference signal cancellation unit 8015; the error control signal extracting unit is configured to generate an error control signal according to an output of the interference signal cancellation unit in the primary interference cancellation processing subunit; the delay and amplitude-phase tracking unit is configured to perform delay and amplitude-phase tracking on a first sub-reference signal according to the error control signal to obtain a reconstructed first sub-self-interference signal; and the interference signal cancellation unit is configured to subtract the reconstructed first sub-self-interference signal from the signal input by the primary interference cancellation processing subunit to eliminate the first sub-self-interference signal.

In a specific circuit structure, the error control signal extracting unit may be implemented by a circuit for measuring power of an error signal, the delay and amplitude-phase tracking unit 8013 may be a delay line, an attenuator, or a phase shifter, and the interference signal cancellation unit 8015 may be implemented by a subtractor, a combiner, or a coupler, and the like.

Figure 9:
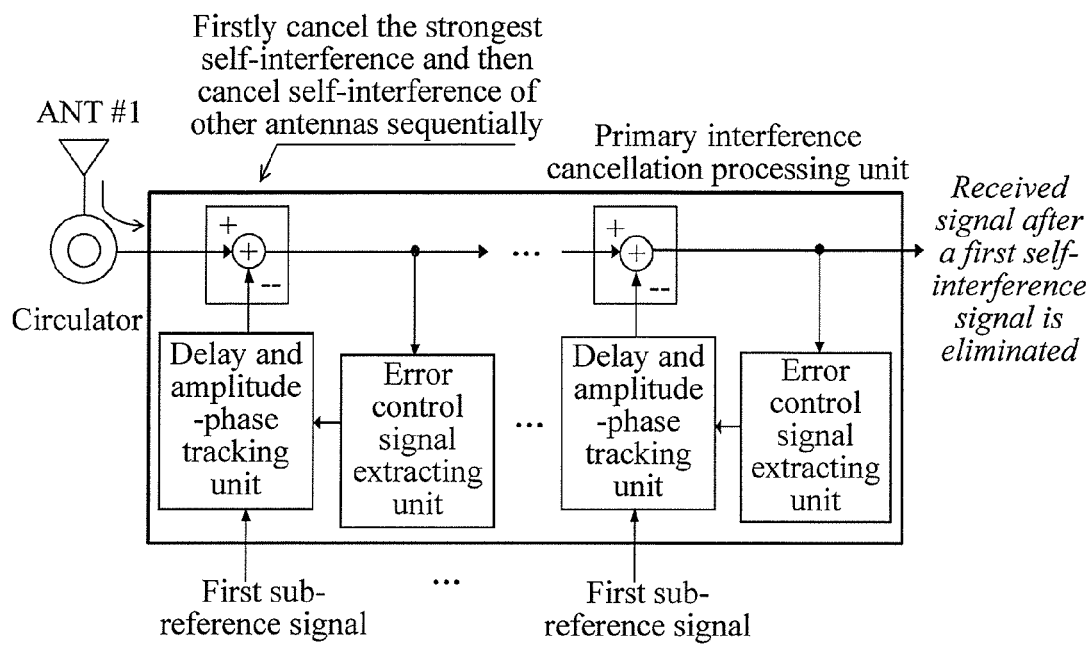
FIG. 9 (a) and FIG. 9 (b) is a structural diagram of another embodiment of a primary interference cancellation processing unit according to the present invention.
Figure 9:
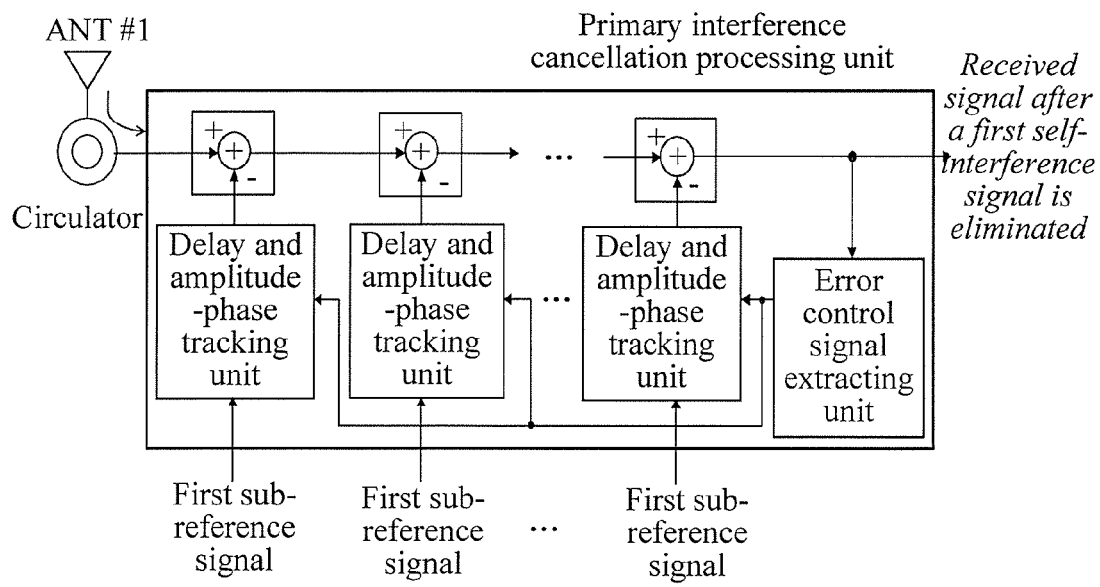

FIG. 9 (a) shows a structural diagram of another embodiment of a primary interference cancellation processing unit according to the present invention. First sub-interference signals of transmission branches are linearly superimposed, are independent of each other, and do not affect each other, so cancellation processing can be performed one by one in a sequential interference elimination manner. Meanwhile, compared with power of the first sub-interference signals, power of other near-zone and far-zone reflection self-interference signal components is far lower, so the components may be regarded as noise in radio frequency main-path self-interference elimination processing, and their impact is not considered.

Additionally, in first sub-interference signals of transmission branches, as far as anyone receive antenna is concerned, the closer the distance between the receive antenna and a transmit antenna is, the smaller the attenuation of the transmit antenna in spatial propagation is, and the stronger the self-interference of a transmission branch corresponding to the transmit antenna is. When an antenna is shared for reception and transmission, a first sub-interference signal leaked to a receiving branch through a duplexer is generally the strongest. Therefore, preferably, main-path self-interference of a branch with the strongest interference may be firstly canceled, and then in a descending sequence of self-interference, main-path self-interference of corresponding transmission branches is canceled sequentially.

A first sub-interference signal cancellation unit of each transmission branch includes a delay and amplitude-phase tracking unit, an error control signal extracting unit, and an interference signal cancellation unit. The delay and amplitude-phase tracking unit self-adaptively adjusts the delay, amplitude, and phase of a first sub-reference signal to generate estimation on a first sub-interference signal of the transmission branch, so that the estimation on the first sub-interference signal of the transmission branch approximates to the first sub-interference signal of the transmission branch in the received signal as much as possible; an interference signal cancellation unit subtracts the estimation on the first sub-interference signal of the transmission branch generated by a main-path interference signal self-adaption delay and amplitude-phase tracking unit, from the received signal, thereby canceling the first sub-interference signal of the transmission branch from the received signal as much as possible.

As described above, the propagation environment of an area near the transmit/receive antenna changes little and a parameter of the transmission channel analog part changes, so the delay, amplitude, and phase of the first sub-interference signal change little and slowly as time goes; an error control signal extracting unit is responsible for generating, according to a signal output after the stage of main-path self-interference cancellation (namely, an error signal), a control signal for the main-path interference signal self-adaption delay and amplitude-phase tracking unit, which is used to control the unit to implement automatic tracking on delay and amplitude-phase changes of the first sub-interference signal corresponding to the transmission branch, thereby minimizing power of the signal output after the stage of main-path self-interference cancellation, and achieving the objective of maximally canceling the main-path self-interference signal of the corresponding transmission branch, where for a delay and amplitude-phase tracking algorithm, an algorithm in the conventional self-adaptive filtering technology such as LMS (Least Mean Squares) or RLS (Recursive least squares) can be adopted.

In another embodiment of the present invention, the primary interference cancellation processing unit includes an error control signal extracting unit and at least one primary interference cancellation processing subunit, and the primary interference cancellation processing subunit includes a delay and amplitude-phase tracking unit and an interference signal cancellation unit. The error control signal extracting unit is configured to generate an error control signal according to an output of the interference signal cancellation unit in the at least one primary interference cancellation processing subunit; the delay and amplitude-phase tracking unit in each interference cancellation processing subunit is configured to perform delay and amplitude-phase tracking on a first sub-reference signal according to the error control signal to obtain a reconstructed first sub-self-interference signal; and the interference signal cancellation unit is configured to subtract the reconstructed first sub-self-interference signal from the signal input by the primary interference cancellation processing subunit to eliminate the first sub-self-interference signal. As shown in FIG. 9 (b), likewise, compared with power of the first sub-interference signals, power of other near-zone and far-zone reflection self-interference signal components is far lower, the components may be regarded as noise in radio frequency main-path self-interference elimination processing, and their impact is not considered. Different from the first embodiment shown in FIG. 9 (a), in a first sub-interference signal cancellation unit corresponding to each transmission branch, the error control signal extracting unit is only located after main-path self-interference signal cancellation units corresponding to all the transmission branches, and extracted error control signals are used as error control signals of main-path interference signal self-adaption delay and amplitude-phase tracking units corresponding to all the transmission branches.

Figure 10:
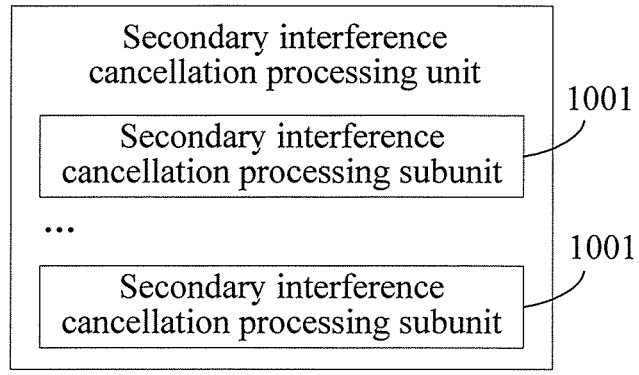
FIG. 10 (a) and FIG. 10 (b) is a schematic structural diagram of an embodiment of a secondary interference cancellation processing unit according to the present invention.
Figure 10:
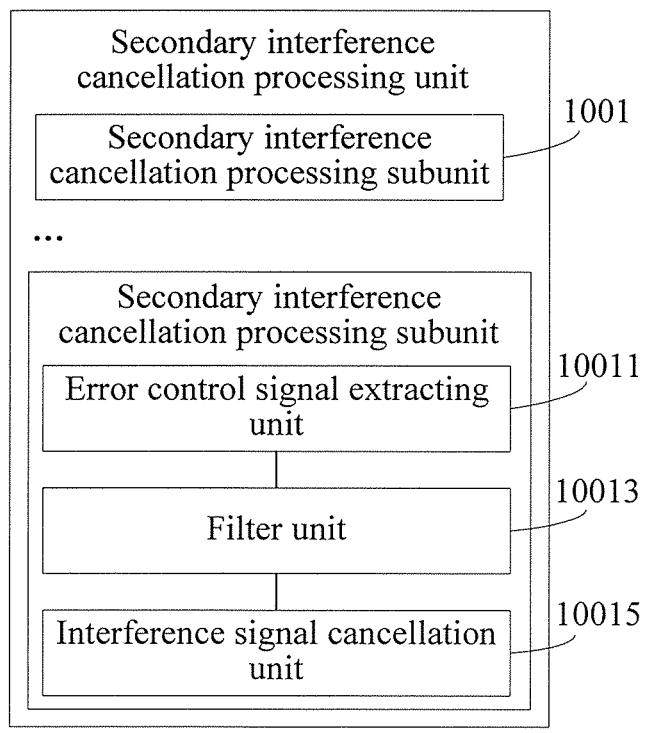

In an embodiment of the present invention, if a local end includes a plurality of local transmit antennas, the second reference signal includes a plurality of second sub-reference signals, and the second self-interference signal includes a plurality of second sub-self-interference signals, where each of the second sub-self-interference signals corresponds to each local transmit antenna of the plurality of local transmit antennas, and the second sub-reference signal is obtained by coupling a transmit signal of a local transmit antenna corresponding to a second sub-self-interference signal; the secondary interference cancellation processing unit is configured to perform multiple secondary sub-processing, by using the plurality of second sub-reference signals, on the received signal, and in each secondary sub-processing, subtract a second sub-reference signal after filter processing, from the signal to be processed by the secondary sub-processing to eliminate a second sub-self-interference signal corresponding to a local transmit antenna corresponding to the second sub-reference signal. As shown in FIG. 10 (a), FIG. 10 (a) is a structural diagram of an embodiment of a secondary interference cancellation processing unit according to the present invention. The secondary interference cancellation processing unit includes a plurality of secondary interference cancellation processing subunits 1001; the secondary interference cancellation processing subunit includes an error control signal extracting unit 10011, a filter unit 10013, and an interference signal cancellation unit 10015; the error control signal extracting unit is configured to generate an error control signal according to an output of the interference signal cancellation unit in the secondary interference cancellation processing subunit; the filter unit is configured to perform filter processing on a second sub-reference signal according to the error control signal to obtain a reconstructed second sub-self-interference signal; and the interference signal cancellation unit is configured to subtract the reconstructed second sub-self-interference signal from the signal input by the secondary interference cancellation processing subunit to eliminate the second sub-self-interference signal. As shown in FIG. 10 (b), FIG. 10 (b) is a structural diagram of an embodiment of a secondary interference cancellation processing unit according to the present invention. FIG. 10 (b) gives a further detailed structural diagram of the secondary interference cancellation processing subunit in FIG. 10 (a).

The error control signal extracting unit may be a power measurement circuit, the filter unit may be a linear combination of a plurality of delay and amplitude-phase tracking units, and the interference signal cancellation unit may be a subtractor or a combiner.

Figure 11:
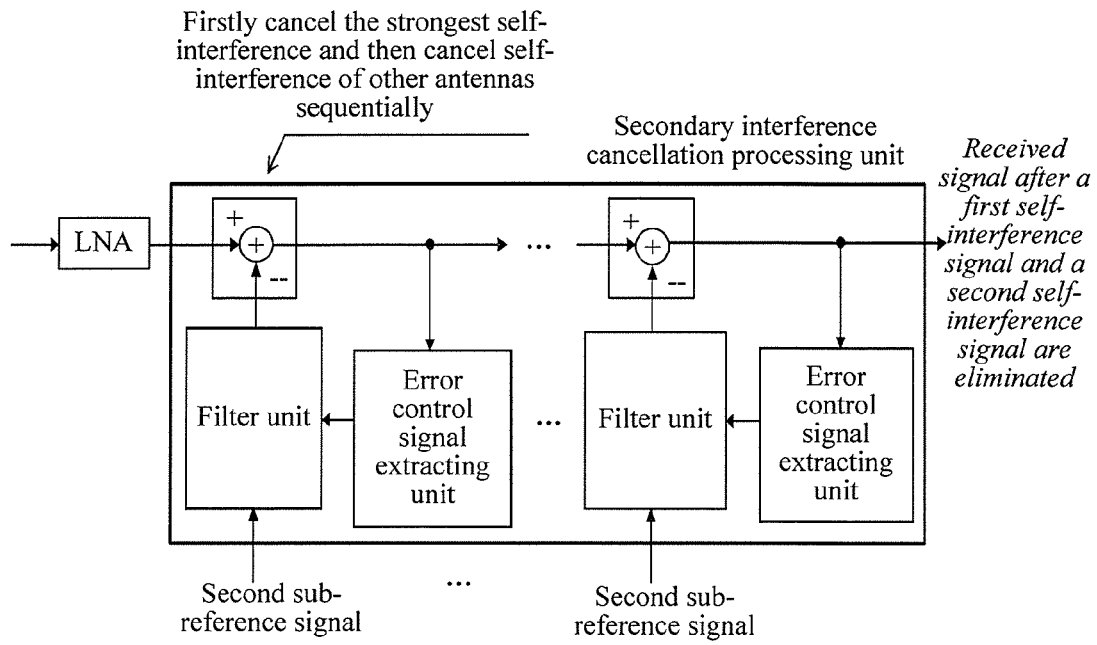
FIG. 11 (a) and FIG. 11 (b) is a structural diagram of another embodiment of a secondary interference cancellation processing unit according to the present invention.
Figure 11:
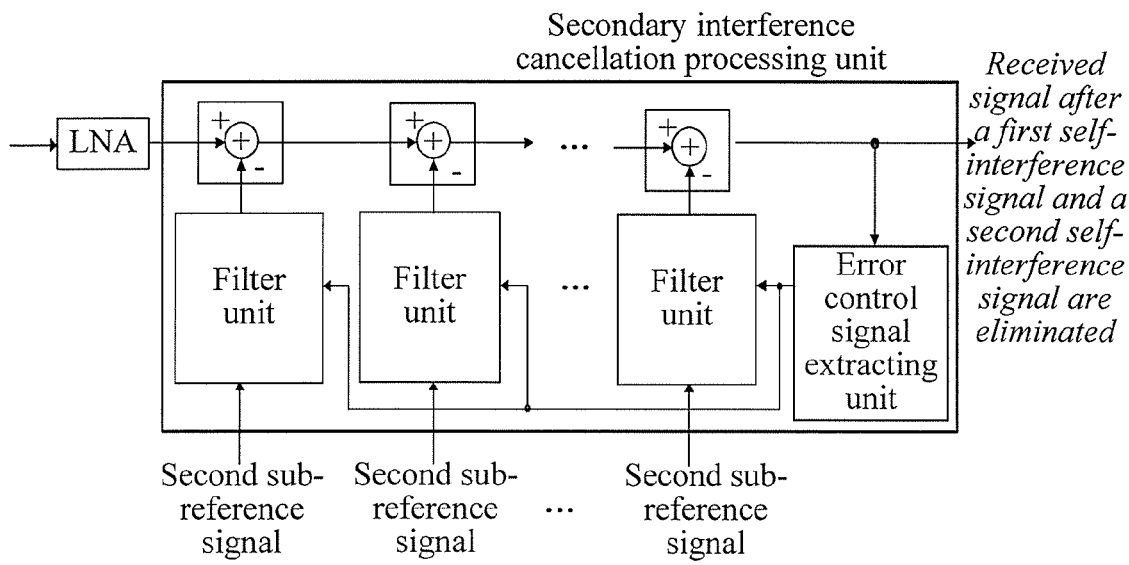

FIG. 11 (a) provides a structural diagram of an embodiment of a secondary interference cancellation processing unit. Components of a near-zone reflection self-interference signal are formed of near-zone reflection multi-path delayed signals of transmit signals of transmission branches. A near-zone reflection channel through which a self-interference signal passes is a frequency selective channel, but self-interference signal components corresponding to transmission branches are still linearly superimposed, are independent of each other, and do not affect each other, so cancellation processing may still be performed one by one in a sequential interference elimination manner. Meanwhile, compared with power of the near-zone reflection self-interference signal components, power of the far-zone reflection self-interference signal components is far lower, so the components may be regarded as noise in the secondary interference cancellation processing, and their impact is not considered.

In another embodiment of the present invention, the secondary interference cancellation processing unit includes an error control signal extracting unit and at least one secondary interference cancellation processing subunit, and the secondary interference cancellation processing subunit includes a filter unit and an interference signal cancellation unit; the error control signal extracting unit is configured to generate an error control signal according to an output of the interference signal cancellation unit in the at least one secondary interference cancellation processing subunit; the filter unit is configured to perform filter processing on a second sub-reference signal according to the error control signal to obtain a reconstructed second sub-self-interference signal; and the interference signal cancellation unit is configured to subtract the reconstructed second sub-self-interference signal from the signal input by the secondary interference cancellation processing subunit to eliminate the second sub-self-interference signal. FIG. 11 (b) further shows a structural diagram of an embodiment of a secondary interference cancellation processing unit.

FIG. 11 (b) further shows another embodiment of secondary interference cancellation processing. Likewise, compared with power of the near-zone reflection self-interference signal components, power of the far-zone reflection self-interference signal components is far lower, so the components may be regarded as noise in the secondary interference cancellation processing, and their impact is not considered. Different from the first embodiment shown in FIG. 11 (a), in a near-zone reflection self-interference signal component cancellation unit corresponding to each transmission branch, the error control signal extracting unit is only located after near-zone reflection self-interference signal cancellation units corresponding to all the transmission branches, and extracted error control signals are used as error control signals of near-zone reflection self-interference signal reconstruction self-adaption filter modules corresponding to all the transmission branches.

Figure 12:
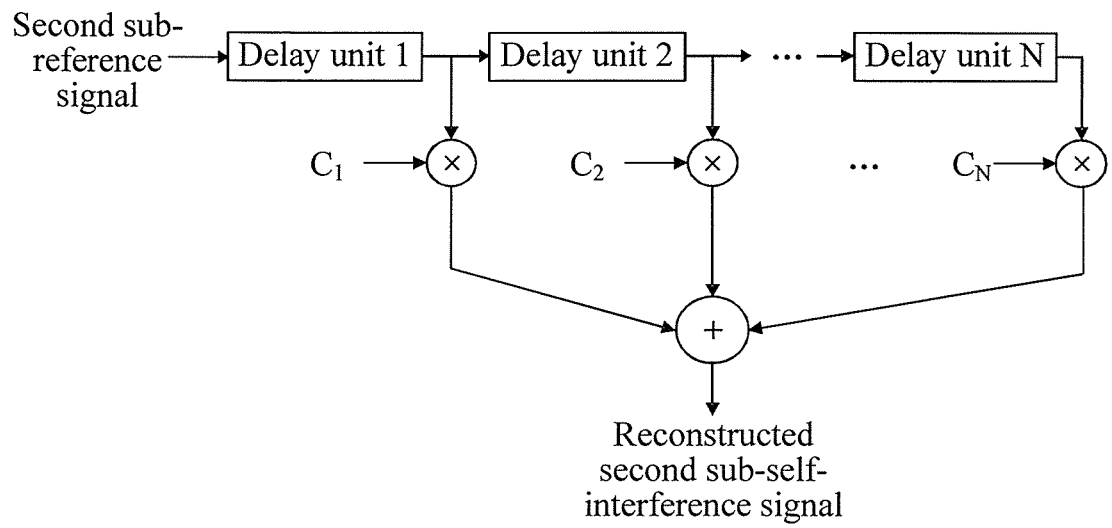
FIG. 12 is a structural diagram of a filter of a secondary interference cancellation processing unit according to an embodiment of the present invention.

As shown in FIG. 12, FIG. 12 gives a structural diagram of an embodiment of a filter unit according to the present invention, and the filter unit is a linear combination of a plurality of delay and amplitude-phase tracking units. The delay and amplitude-phase tracking unit is configured to perform delay and amplitude-phase tracking on a second sub-reference signal according to the error control signal, and the filter unit is configured to perform linear weighting on the second sub-reference signal after the delay and amplitude-phase tracking to obtain a reconstructed second sub-self-interference signal.

Structures of a tertiary interference cancellation processing unit and a quaternary interference cancellation processing unit are similar to the structure of the secondary interference cancellation processing unit, and therefore are not described anymore. The difference is that, the multi-path propagation delay of a far-zone reflection self-interference signal component is in the order of magnitude of 30 ns to 1 us, while in a typical embodiment, the time delay of each fixed delay unit in the tertiary interference cancellation processing and the quaternary interference cancellation processing is 20 ns. The quaternary interference cancellation processing mainly plays a role of avoiding excessively strong self-interference so that the dynamic range of the ADC is not exceeded, and therefore, a lower filter order (namely, the number of fixed delay units) can be adopted; however, the self-adaptive filter in the tertiary interference cancellation processing adopts a digital manner to achieve high precision, and undertakes a main function of effectively canceling a far-zone reflection self-interference signal component and other residual self-interference components, so a larger filter order (namely, the number of fixed delay units) can be adopted. For example, the filter order of the quaternary interference cancellation processing is 10, while the filter order of the tertiary interference cancellation processing is 50.

Near-zone reflection self-interference signal components are formed of a near-zone reflection multi-path delayed signal of a transmit signal of each transmission branch, so an embodiment of the present invention provides a method for reconstructing a near-zone reflection self-interference signal component (also including residual interference of a first sub-interference signal). As shown in FIG. 12, FIG. 12 provides a method for reconstructing a near-zone reflection self-interference signal component according to an embodiment of the present invention. A self-adaptive filter corresponding to a method for reconstructing a self-interference signal includes N fixed delay units. The typical multi-path propagation delay of a near-zone reflection self-interference signal component is in the order of magnitude of 1 ns to 30 ns, so in a specific embodiment, 15 fixed delay units are adopted, and the delay of each fixed delay unit is 2 ns. The fixed delay unit may be implemented by adopting a part such as an analog delay line.

Figure 13:
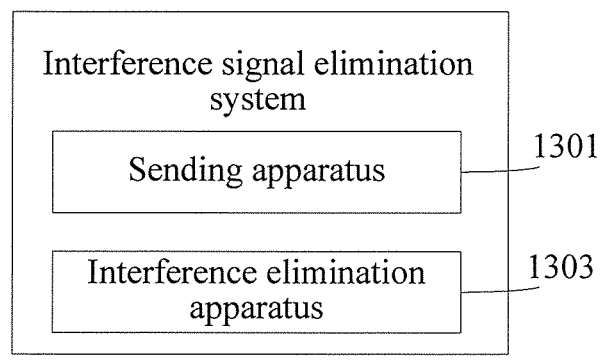
FIG. 13 is a schematic structural diagram of an embodiment of a system for eliminating an interference signal according to the present invention.

An embodiment of the present invention provides a system having an interference signal elimination function, as shown in FIG. 13. FIG. 13 provides a structural diagram of an embodiment of the system having an interference signal elimination function according to the present invention. The system includes a sending apparatus and the interference elimination apparatus according to any one of the foregoing embodiments, and the sending apparatus is configured to send a radio signal received by the interference elimination apparatus.

Figure 14:
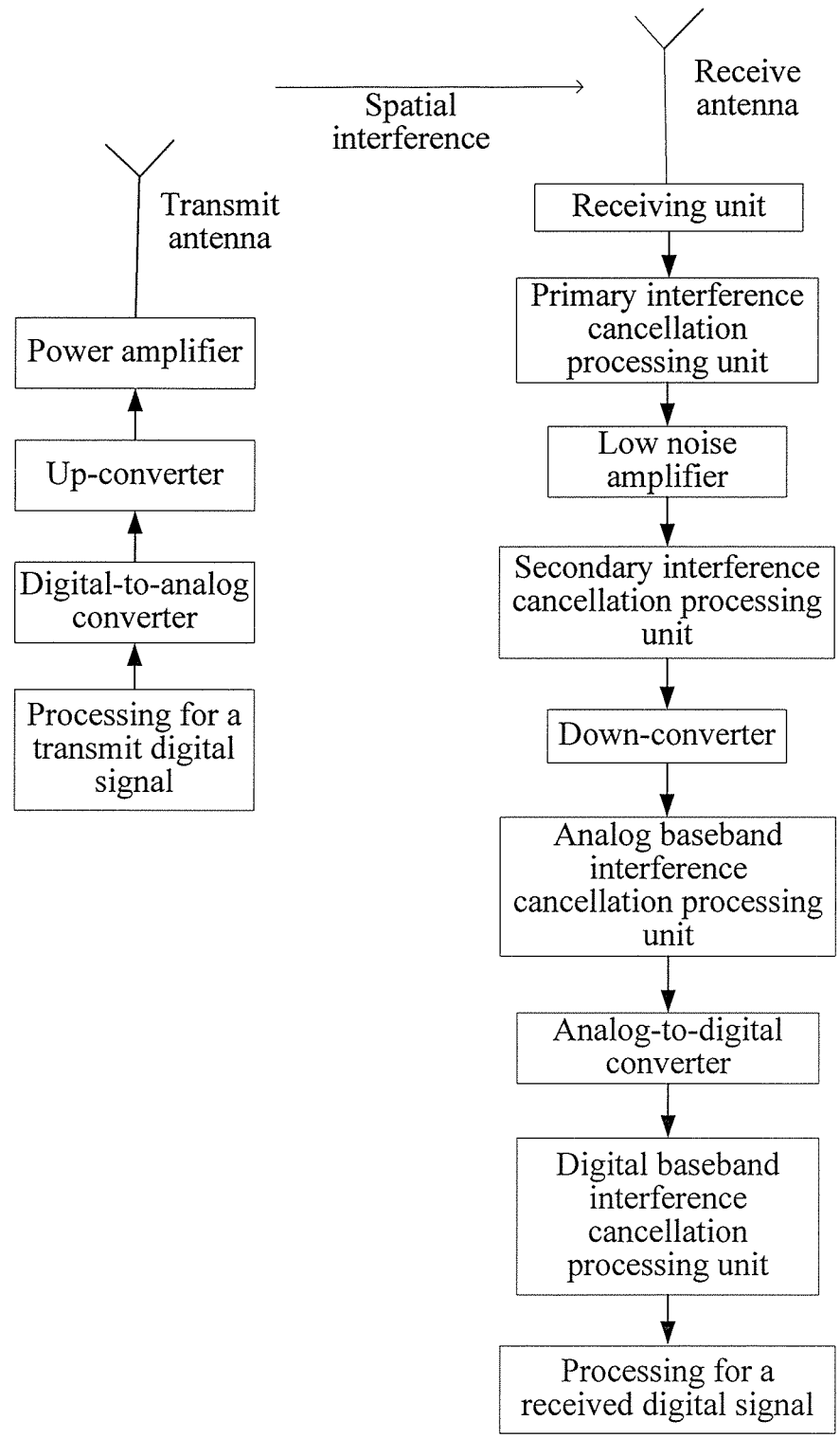
FIG. 14 is a structural diagram of another embodiment of a system for eliminating an interference signal according to an embodiment of the present invention.

FIG. 14 provides a structural diagram of a transmission branch and a receiving branch of a system for eliminating an interference signal according to an embodiment of the present invention.

The second reference signal and the first reference signal are the same. Through the description of the above embodiments, persons skilled in the art may clearly understand that the present invention may be implemented with hardware, firmware, or a combination thereof. If the present invention is implemented with software, the functions may be stored in a computer readable medium or used as one or more instructions or codes on a computer readable medium for transmission. The computer readable medium includes a computer storage medium and a communication medium, where the communication medium includes any medium for conveniently transferring a computer program from a place to another place. The storage medium may be any available medium that can be accessed by a computer. By way of example, and not limitation, the computer readable medium may include a RAM, a ROM, an EEPROM, a CD-ROM or any other optical disk storage, a magnetic disk storage or any other magnetic storage device, or any other medium that can be used to carry or store desired program codes in the form of instructions or data structures and that can be accessed by a computer. Additionally, any connection may appropriately be used as a computer readable medium. For example, if the software is transmitted from a website, server, or any other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of the medium. The disk (Disk) and disc (disc), as used in the present invention, include a compact disc (CD), a laser disc, an optical disc, a digital versatile disc (DVD), a floppy disk, and a Blu-ray disc, where disks usually reproduce data magnetically, while discs reproduce data optically with lasers. The above combination should also be included in the protection scope of the computer readable medium.

Those skilled in the art may understand that the modules in the apparatuses provided in the embodiments may be disposed in the apparatuses in a distributed manner according to the description of the embodiments, or may be disposed in one or multiple apparatuses which are different from those described in the embodiments. The modules according to the above embodiments may be combined into one module, or split into multiple submodules.

Persons of ordinary skill in the art may understand that all or a part of the steps of the foregoing method embodiments may be implemented by a program instructing relevant hardware. The program may be stored in a computer-readable storage medium, and the storage medium may include a ROM/RAM, a magnetic disk, and an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not cause the essence of corresponding technical solutions to depart from the spirit and scope of the technical solutions of the embodiments of the present invention.

What is claimed is:

1. A method for processing an interference signal, the method comprising:
receiving a radio signal comprising a self-interference signal of a transmit antenna, the self-interference signal comprises a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold;
performing primary interference cancellation processing, by using a first reference signal, on the received radio signal to eliminate the first self-interference signal, wherein the first reference signal is obtained by coupling a local transmit signal; and
performing secondary interference cancellation processing, by using a second reference signal, on the received radio signal after the primary interference cancellation processing to eliminate the second self-interference signal, wherein the second reference signal is obtained by coupling a local transmit signal.

2. The method according to claim 1, wherein:
the self-interference signal further comprises a third self-interference signal, power of the third self-interference signal is less than the second power threshold, and a time delay of the third self-interference signal is greater than the second time delay threshold; and
after performing secondary interference cancellation processing, the method further comprises:
performing tertiary interference cancellation processing, by using a third reference signal, on the signal after the primary interference cancellation processing and the secondary interference cancellation processing to eliminate the third self-interference signal, wherein the third reference signal comprises: a digital baseband signal of a transmit end, a signal for compensating a digital baseband signal of a transmit end, or a signal obtained by performing down-conversion and analog-to-digital conversion on the first reference signal.

3. The method according to claim 1, wherein:
the first self-interference signal comprises a main-path self-interference signal;
if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal comprises a transmit signal of each local transmit antenna or a transmit signal of a local transmit antenna; and
performing primary interference cancellation processing to eliminate the first self-interference signal comprises:
performing the primary interference cancellation processing to eliminate the main-path self-interference signal.

4. The method according to claim 1, wherein:
the second self-interference signal comprises a near-zone reflection self-interference signal, the near-zone reflection self-interference signal is generated after a local transmit signal enters a local receive end through a non-line-of-sight path reflected by a near-zone diffuser, and the local transmit signal comprises a transmit signal of each local transmit antenna or comprises a transmit signal of a local transmit antenna; and
performing secondary interference cancellation processing to eliminate the second self-interference signal comprises:
performing the secondary interference cancellation processing to eliminate the near-zone reflection self-interference signal.

5. The method according to claim 1, wherein:
the third self-interference signal comprises a far-zone reflection self-interference signal, the far-zone reflection self-interference signal is generated after a local transmit signal enters a local receive end through a non-line-of-sight path reflected by a far-zone diffuser, and the local transmit signal comprises a transmit signal of each local transmit antenna or comprises a transmit signal of a local transmit antenna; and
performing tertiary interference cancellation processing to eliminate the third self-interference signal comprises:
performing the tertiary interference cancellation processing to eliminate the far-zone reflection self-interference signal.

6. The method according to claim 1, wherein:
after performing primary interference cancellation processing to eliminate the first self-interference signal, the method further comprises:
performing low noise amplification processing on the signal after the first self-interference signal is eliminated; and
performing secondary interference cancellation processing, by using a second reference signal, on the signal after the primary interference cancellation processing comprises:
performing the secondary interference cancellation processing, by using the second reference signal, on the signal after the primary interference cancellation processing and the low noise amplification processing.

7. The method according to claim 1, wherein:
after the second self-interference signal is eliminated, the method further comprises:
performing down-conversion processing on the signal after the second self-interference signal is eliminated; and
performing tertiary interference cancellation processing, by using a third reference signal, on the signal after the primary interference cancellation processing and the secondary interference cancellation processing comprises:
performing the tertiary interference cancellation processing, by using the third reference signal, on the signal after the primary interference cancellation processing, the secondary interference cancellation processing, and the down-conversion processing.

8. The method according to claim 1, wherein:
performing tertiary interference cancellation processing, by using a third reference signal, on the signal after the primary interference cancellation processing and the secondary interference cancellation processing comprises:

performing analog-to-digital conversion on the signal after the primary interference cancellation processing and the secondary interference cancellation processing, and subtracting the third reference signal after digital filter processing, from the signal after the analog-to-digital conversion.

9. The method according to claim 8, wherein:

before performing analog-to-digital conversion on the signal after the primary interference cancellation processing and the secondary interference cancellation processing, and subtracting the third reference signal after digital filter processing, from the signal after the analog-to-digital conversion, performing tertiary interference cancellation processing, by using a third reference signal, on the signal after the primary interference cancellation processing and the secondary interference cancellation processing, the method further comprises:

subtracting a fourth reference signal after filter processing, from the signal after the primary interference cancellation processing and the secondary interference cancellation processing, wherein the fourth reference signal is obtained by using the following signal: the third reference signal, an analog baseband signal of a transmit antenna, a signal for compensating an analog baseband signal of a transmit antenna, or a signal obtained by performing down-conversion on the first reference signal; and performing analog-to-digital conversion on the signal after the primary interference cancellation processing and the secondary interference cancellation processing, and subtracting the third reference signal after digital filter processing, from the signal after the analog-to-digital conversion comprises:

subtracting the fourth reference signal after the filter processing, from the signal after the primary interference cancellation processing and the secondary interference cancellation processing, performing the analog-to-digital conversion on the signal after the subtraction, and subtracting the third reference signal after the digital filter processing, from the signal after the analog-to-digital conversion.

10. The method according to claim 1, wherein:

if a local end comprises a plurality of local transmit antennas, the first reference signal comprises a plurality of first sub-reference signals, and the first self-interference signal comprises a plurality of first sub-self-interference signals, wherein each of the first sub-self-interference signals corresponds to each local transmit antenna of the plurality of local transmit antennas, and the first sub-reference signal is obtained by coupling a transmit signal of a local transmit antenna corresponding to a first sub-self-interference signal;

performing primary interference cancellation processing, by using a first reference signal, on the received signal comprises:

performing multiple primary sub-processing, by using the first sub-reference signals, on the received signal; and performing primary sub-processing comprises:

subtracting a first sub-reference signal after delay and amplitude-phase adjustment, from the signal to be processed by the primary sub-processing to eliminate a first sub-self-interference signal corresponding to a local transmit antenna corresponding to the first sub-reference signal.

11. The method according to claim 1, wherein:

if a local end comprises a plurality of local transmit antennas, the second reference signal comprises a plurality of second sub-reference signals, and the second self-interference signal comprises a plurality of second sub-self-interference signals, wherein each of the second sub-self-interference signals corresponds to each local transmit antenna of the plurality of local transmit antennas, and the second sub-reference signal is obtained by coupling a transmit signal of a local transmit antenna corresponding to a second sub-self-interference signal;

performing secondary interference cancellation processing, by using a second reference signal, on the received signal comprises:

performing multiple secondary sub-processing, by using the second sub-reference signals, on the received signal; and performing secondary sub-processing comprises:

subtracting a second sub-reference signal after filter processing, from the signal to be processed by the secondary sub-processing to eliminate a second sub-self-interference signal corresponding to a local transmit antenna corresponding to the second sub-reference signal.

12. An apparatus for processing an interference signal, the apparatus comprising:

one or more local transmit antennas;

a receiving circuit configured to receive a radio signal comprising a self-interference signal of the one or more local transmit antennas, the self-interference signal comprises a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold;

a primary interference cancellation processing circuit configured to perform primary interference cancellation processing, by using a first reference signal, on the received radio signal to eliminate the first self-interference signal, wherein the first reference signal is obtained by coupling a local transmit signal; and a secondary interference cancellation processing circuit configured to perform secondary interference cancellation processing, by using a second reference signal, on the received radio signal after the primary interference cancellation processing to eliminate the second self-interference signal, wherein the second reference signal and the first reference signal are the same.

13. The apparatus according to claim 12, wherein:

the self-interference signal further comprises a third self-interference signal, power of the third self-interference signal is less than the second power threshold, and a time delay of the third self-interference signal is greater than the second time delay threshold; and the apparatus further comprises a tertiary interference cancellation processing circuit, configured to perform tertiary interference cancellation processing, by using a third reference signal, on the signal after the primary interference cancellation processing and the secondary interference cancellation processing to eliminate the third self-interference signal, wherein the third reference signal comprises: a digital baseband signal of a transmit end, a signal for compensating a digital baseband signal of a transmit end, or a signal obtained by performing down-conversion and analog-to-digital conversion on the first reference signal.

14. The apparatus according to claim 13, wherein:
the third self-interference signal comprises a far-zone reflection self-interference signal, the far-zone reflection self-interference signal is generated after a local transmit signal enters a local receive end through a non-line-of-sight path reflected by a far-zone diffuser, and the local transmit signal comprises a transmit signal of each local transmit antenna or comprises a transmit signal of a local transmit antenna; and
the tertiary interference cancellation processing circuit is configured to eliminate the far-zone reflection self-interference signal.

15. The apparatus according to claim 13, wherein:
the apparatus further comprises a low noise amplification processing circuit, configured to perform, after the first self-interference signal is eliminated, low noise amplification processing on the signal after the first self-interference signal is eliminated; and
the secondary interference cancellation processing circuit is configured to perform the secondary interference cancellation processing, by using the second reference signal, on the signal processed by the primary interference cancellation processing circuit and the low noise amplification processing circuit.

16. The apparatus according to claim 13, wherein:
the apparatus further comprises a down-conversion circuit, configured to: after the second self-interference signal is eliminated, perform down-conversion processing on the signal after the second self-interference signal is eliminated; and
the tertiary interference cancellation processing circuit performs the tertiary interference cancellation processing, by using the third reference signal, on the signal processed by the primary interference cancellation processing circuit, the secondary interference cancellation processing circuit, and the down-conversion circuit.

17. The apparatus according to claim 13, wherein the tertiary interference cancellation processing circuit is configured to:
perform analog-to-digital conversion on the signal after the primary interference cancellation processing and the secondary interference cancellation processing; and
subtract the third reference signal after digital filter processing, from the signal after the analog-to-digital conversion.

18. The apparatus according to claim 13, wherein the tertiary interference cancellation processing circuit is configured to:
subtract a fourth reference signal after filter processing, from the signal after the primary interference cancellation processing and the secondary interference cancellation processing;
perform the analog-to-digital conversion on the signal after the subtraction; and
subtract the third reference signal after the digital filter processing, from the signal after the analog-to-digital conversion, wherein the fourth reference signal is obtained by using the following signal: the third reference signal, an analog baseband signal of a transmit antenna, a signal for compensating an analog baseband signal of a transmit antenna, or a signal obtained by performing down-conversion on the first reference signal.

19. The apparatus according to claim 12, wherein:
the first self-interference signal comprises a main-path self-interference signal;
if different antennas are adopted for reception and transmission, the main-path self-interference signal is generated after a local transmit signal enters a local receive end through a line-of-sight path; or if an antenna is shared for reception and transmission, the main-path self-interference signal is generated after a local transmit signal is leaked to a local receive end through a transmit/receive isolator, and the local transmit signal comprises a transmit signal of each local transmit antenna or a transmit signal of a local transmit antenna; and
the primary interference cancellation processing circuit is configured to eliminate the main-path self-interference signal.

20. The apparatus according to claim 12, wherein:
the second self-interference signal comprises a near-zone reflection self-interference signal, the near-zone reflection self-interference signal is generated after a local transmit signal enters a local receive end through a non-line-of-sight path reflected by a near-zone diffuser, and the local transmit signal comprises a transmit signal of each local transmit antenna or comprises a transmit signal of a local transmit antenna; and
the second interference cancellation processing circuit is configured to eliminate the near-zone reflection self-interference signal.

21. The apparatus according to claim 12, wherein:
if the apparatus comprises a plurality of local transmit antennas, the first reference signal comprises a plurality of first sub-reference signals, and the first self-interference signal comprises a plurality of first sub-self-interference signals, wherein each of the first sub-self-interference signals corresponds to each local transmit antenna of the plurality of local transmit antennas, and the first sub-reference signal is obtained by coupling a transmit signal of a local transmit antenna corresponding to a first sub-self-interference signal; and
the primary interference cancellation processing circuit is configured to perform multiple primary sub-processing, by using the plurality of first sub-reference signals, on the received signal, and in each primary sub-processing, subtract a corresponding first sub-reference signal after delay and amplitude-phase adjustment, from the signal to be processed by the primary sub-processing to eliminate a first sub-self-interference signal corresponding to a local transmit antenna corresponding to the first sub-reference signal.

22. The apparatus according to claim 12, wherein:
the primary interference cancellation processing circuit comprises at least one primary interference cancellation processing subcircuit comprising an error control signal extracting circuit, a delay and amplitude-phase tracking circuit, and an interference signal cancellation circuit, wherein:
the error control signal extracting circuit is configured to generate an error control signal according to an output of the interference signal cancellation circuit in the primary interference cancellation processing subcircuit;

the delay and amplitude-phase tracking circuit is configured to perform delay and amplitude-phase tracking on a first sub-reference signal according to the error control signal to obtain a reconstructed first sub-self-interference signal; and the interference signal cancellation circuit is configured to subtract the reconstructed first sub-self-interference signal from the signal input by the primary interference cancellation processing subcircuit to eliminate the first sub-self-interference signal.

23. The apparatus according to claim 12, wherein:

the primary interference cancellation processing circuit comprises an error control signal extracting circuit and at least one primary interference cancellation processing subcircuit comprising a delay and amplitude-phase tracking circuit and an interference signal cancellation circuit, wherein:

the error control signal extracting circuit is configured to generate an error control signal according to an output of the interference signal cancellation circuit in the at least one primary interference cancellation processing subcircuit;

the delay and amplitude-phase tracking circuit in each primary interference cancellation processing subcircuit is configured to perform delay and amplitude-phase tracking on a first sub-reference signal according to the error control signal to obtain a reconstructed first sub-self-interference signal; and the interference signal cancellation circuit is configured to subtract the reconstructed first sub-self-interference signal from the signal input by the primary interference cancellation processing subcircuit to eliminate the first sub-self-interference signal.

24. The apparatus according to claim 12, wherein:

when the apparatus comprises a plurality of local transmit antennas, the second reference signal comprises a plurality of second sub-reference signals, and the second self-interference signal comprises a plurality of second sub-self-interference signals, wherein each of the second sub-self-interference signals corresponds to each local transmit antenna of the plurality of local transmit antennas, and the second sub-reference signal is obtained by coupling a transmit signal of a local transmit antenna corresponding to a second sub-self-interference signal; and the secondary interference cancellation processing circuit is configured to perform multiple secondary sub-processing, by using the plurality of second sub-reference signals, on the received signal, and in each secondary sub-processing, subtract a second sub-reference signal after filter processing, from the signal to be processed by the secondary sub-processing to eliminate a second sub-self-interference signal corresponding to a local transmit antenna corresponding to the second sub-reference signal.

25. The apparatus according to claim 12, wherein:

the secondary interference cancellation processing circuit comprises at least one secondary interference cancellation processing subcircuit comprising an error control signal extracting circuit, a filter circuit, and an interference signal cancellation circuit, wherein:

the error control signal extracting circuit is configured to generate an error control signal according to an output of the interference signal cancellation circuit in the secondary interference cancellation processing subcircuit;

the filter circuit is configured to perform filter processing on a second sub-reference signal according to the error control signal to obtain a reconstructed second sub-self-interference signal; and the interference signal cancellation circuit is configured to subtract the reconstructed second sub-self-interference signal from the signal input by the secondary interference cancellation processing subcircuit to eliminate the second sub-self-interference signal.

26. The apparatus according to claim 12, wherein:

the secondary interference cancellation processing circuit comprises an error control signal extracting circuit and at least one secondary interference cancellation processing subcircuit comprising a filter circuit and an interference signal cancellation circuit, wherein:

the error control signal extracting circuit is configured to generate an error control signal according to an output of the interference signal cancellation circuit in the at least one secondary interference cancellation processing subcircuit;

the filter circuit is configured to perform filter processing on a second sub-reference signal according to the error control signal to obtain a reconstructed second sub-self-interference signal; and the interference signal cancellation circuit is configured to subtract the reconstructed second sub-self-interference signal from the signal input by the secondary interference cancellation processing subcircuit to eliminate the second sub-self-interference signal.

27. A system having an interference signal elimination function, the system comprising:

a sending apparatus; and an apparatus for processing an interference signal, the apparatus for processing the interference signal comprising:

one or more local transmit antennas;

a receiving circuit configured to receive a radio signal comprising a self-interference signal of the one or more local transmit antennas, the self-interference signal comprises a first self-interference signal and a second self-interference signal, power of the first self-interference signal is greater than a first power threshold, a time delay of the first self-interference signal is less than a first time delay threshold, power of the second self-interference signal is less than the first power threshold and greater than a second power threshold, and a time delay of the second self-interference signal is greater than the first time delay threshold and less than a second time delay threshold;

a primary interference cancellation processing circuit configured to perform primary interference cancellation processing, by using a first reference signal, on the received radio signal to eliminate the first self-interference signal, wherein the first reference signal is obtained by coupling a local transmit signal; and a secondary interference cancellation processing circuit configured to perform secondary interference cancellation processing, by using a second reference signal, on the received radio signal after the primary interference cancellation processing to eliminate the second self-interference signal, wherein the second reference signal and the first reference signal are the same; and the sending apparatus is configured to send a radio signal to be received by the apparatus for processing the interference signal.

\* \* \* \* \*